US009225946B2

(12) United States Patent
Lim et al.

(10) Patent No.: US 9,225,946 B2
(45) Date of Patent: Dec. 29, 2015

(54) METHODS AND APPARATUSES FOR ENCODING, EXTRACTING AND DECODING VIDEO USING TILES CODING SCHEME

(71) Applicant: Panasonic Intellectual Property Corporation of America, Torrance, CA (US)

(72) Inventors: Chong Soon Lim, Singapore (SG); Sue Mon Thet Naing, Singapore (SG); Hai Wei Sun, Singapore (SG); Viktor Wahadaniah, Singapore (SG); Takahiro Nishi, Nara (JP); Hisao Sasai, Osaka (JP); Youji Shibahara, Osaka (JP); Toshiyasu Sugio, Osaka (JP); Kyoko Tanikawa, Osaka (JP); Toru Matsunobu, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 13 days.

(21) Appl. No.: 14/151,063

(22) Filed: Jan. 9, 2014

(65) Prior Publication Data
US 2014/0119671 A1  May 1, 2014

Related U.S. Application Data

(63) Continuation of application No. PCT/JP2012/005289, filed on Aug. 23, 2012.

(60) Provisional application No. 61/527,151, filed on Aug. 25, 2011.

(51) Int. Cl.
*G06K 9/36*  (2006.01)
*G06K 9/46*  (2006.01)
(Continued)

(52) U.S. Cl.
CPC ......... *H04N 7/26824* (2013.01); *H04N 19/105* (2014.11); *H04N 19/119* (2014.11);
(Continued)

(58) Field of Classification Search
None
See application file for complete search history.

(56) References Cited

U.S. PATENT DOCUMENTS 7,613,345 B2  11/2009  Kajiwara et al.
2005/0249283 A1  11/2005  Kajiwara et al.
(Continued)

FOREIGN PATENT DOCUMENTS

JP  2005-348390  12/2005

OTHER PUBLICATIONS

Hisao Sasai et al., "Constrained Tile for parallel decoding", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document: JCTVC-H0345, XP030111372.
(Continued)

*Primary Examiner* — Phuoc Tran
(74) *Attorney, Agent, or Firm* — Wenderoth, Lind & Ponack, L.L.P.

(57) ABSTRACT

State-of-the-art video coding schemes supports splitting a picture into smaller rectangular units called tiles units. Each tile units can be independently encoded and decoded by separate encoders and decoders, respectively. The primary purpose of tiles units is to allow parallel processing of the picture to reduce implementation cost and complexity. The present disclosure provides additional functionality to define flexible partitioned tile regions and to allow partial decoding and reconstruction of tile regions.

12 Claims, 33 Drawing Sheets

(51) Int. Cl.
*H04N 19/55* (2014.01)
*H04N 19/176* (2014.01)
*H04N 19/70* (2014.01)
*H04N 19/119* (2014.01)
*H04N 19/157* (2014.01)
*H04N 19/436* (2014.01)
*H04N 19/105* (2014.01)
*H04N 19/51* (2014.01)

(52) U.S. Cl.
CPC ........... *H04N19/157* (2014.11); *H04N 19/176* (2014.11); *H04N 19/436* (2014.11); *H04N 19/51* (2014.11); *H04N 19/55* (2014.11); *H04N 19/70* (2014.11)

(56) References Cited

U.S. PATENT DOCUMENTS

2010/0232504 A1    9/2010   Feng
2012/0163452 A1*   6/2012   Horowitz ................ 375/240.12

OTHER PUBLICATIONS

Arild Fuldseth et al., "Tiles", Joint Collaborative Team on Video Coding (JCT-VC) of ITU-T SG16 WP3 and ISO/IEC JTC1/SC29/WG11, 5th Meeting: Geneva, CH, Mar. 16-23, 2011, XP030048513.
Ye-Kui Wang, "Motion-Constrained Slice Group Indicator", Joint Video Team (JVT) of ISO/IEC MPEG & ITU-T VCEG (ISO/IEC JTC1/SC29/WG11 and ITU-T SG16 Q.6), 5th Meeting: Geneva, CH, Oct. 9-17, 2002, XP030005544.
P. Lambert et al., "Flexible macroblock ordering in H.264/AVC", Journal of Visual Communication and Image Representation, Academic Press, Inc., US, vol. 17, No. 2, Apr. 1, 2006, pp. 358-375, XP024905097.
Rapporteur Q6/16, "Advanced video coding for generic audiovisual services", Draft revised Recommendation ITU-T H.264, ITU-T SG16 Meeting, Mar. 14-25, 2011, Geneva, CH, Mar. 21, 2011, XP030100592.
Minhua Zhou, "AHG4: Enable parallel decoding with tiles", Joint Collaborative Team on Video Coding (JCT-VC) of ITU-T SG16 WP3 and ISO/IEC JTC1/SC29/WG11, 9th Meeting: Geneva, Switzerland, Apr. 27-May 7, 2012, Document: JCTVC-I0118, XP030111881.
Extended European Search Report issued Dec. 23, 2014 in corresponding European Application No. 12826169.0.
International Search Report issued Nov. 20, 2012 in corresponding International Application No. PCT/JP2012/005289.
Arild Fuldseth et al., "Tiles", Joint Collaborative Team on Video Coding (JCT-VC) of ITU-T SG16 WP3 and ISO/IEC JTC1/SC29/WG11 6th Meeting: Torino, IT, Jul. 14, 2011, [JCTVC-F335].
A. Fuldseth, "Replacing slices with tiles for high level parallelism", Joint Collaborative Team on Video Coding (JCT-VC) of ITIJ-T SG16 WP3 and ISO/IEC JTC1/SC29/WG11 4th Meeting: Daegu, KR, Jan. 20, 2011, [JCTVC-D227].
Andrew Segall et al., "A Highly Efficient and Highly Parallel System for Video Coding", Joint Collaborative Team on Video Coding (JCT-VC) of ITU-T SG16 WP3 and ISO/IEC JTC1/SC29/WG11 1st Meeting: Dresden, DE, Apr. 15, 2010 [JCTVC-A105].

* cited by examiner

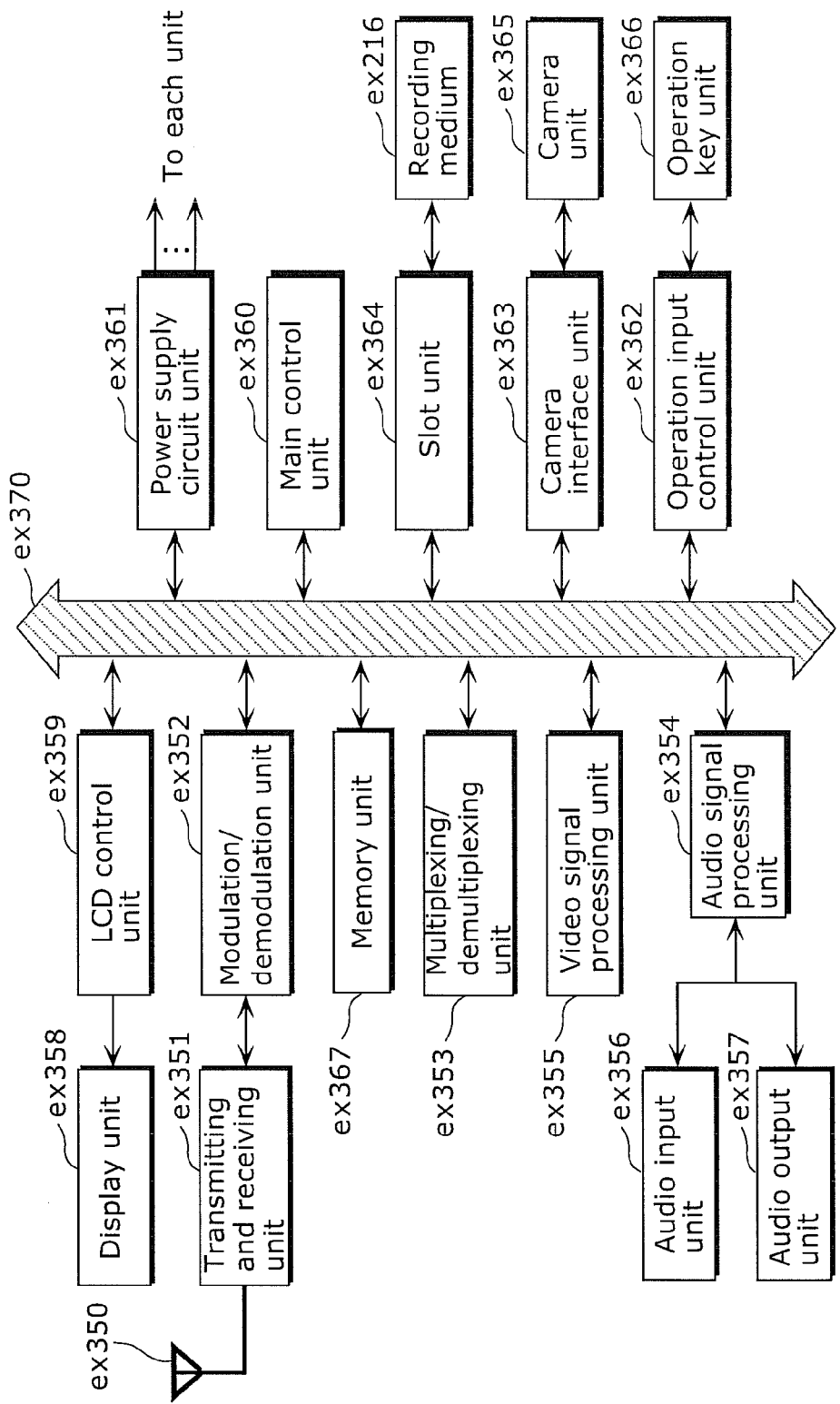

FIG. 20

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

FIG. 23
Stream of TS packets
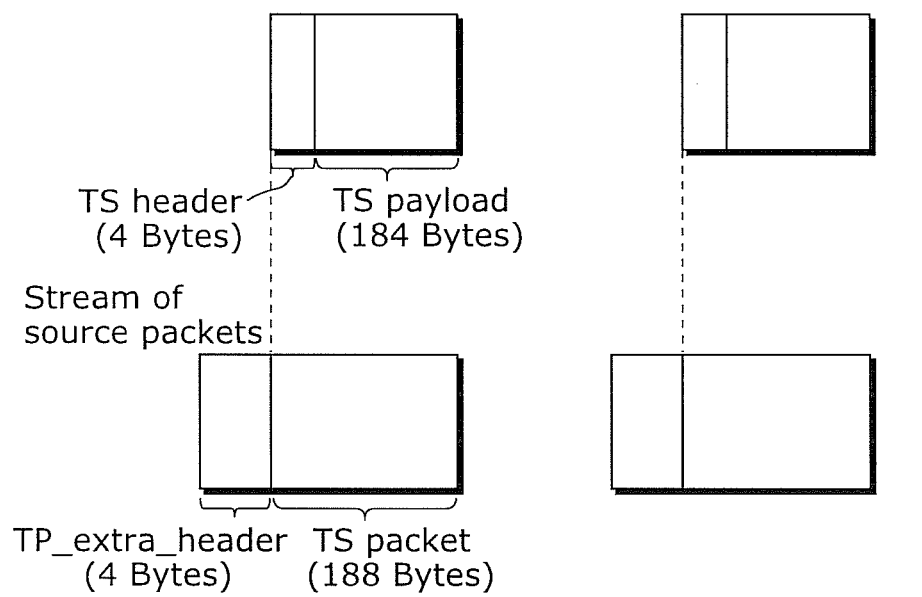
TS header (4 Bytes)
TS payload (184 Bytes)
Stream of source packets
TP_extra_header (4 Bytes)
TS packet (188 Bytes)
Multiplexed data
SPN 0 1 2 3 4 5 6 7 ...
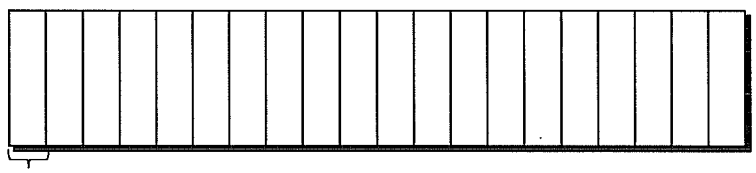
Source packet

FIG. 31

| Corresponding standard | Driving frequency |
|---|---|
| MPEG-4 AVC | 500 MHz |
| MPEG-2 | 350 MHz |
| ⋮ | ⋮ |

METHODS AND APPARATUSES FOR ENCODING, EXTRACTING AND DECODING VIDEO USING TILES CODING SCHEME

CROSS REFERENCE TO RELATED APPLICATIONS

This is a continuation application of PCT International Application No. PCT/JP2012/005289 filed on Aug. 23, 2012, designating the United States of America, which is based on and claims priority of U.S. Patent Application No. 61/527,151 filed on Aug. 25, 2011. The entire disclosures of the above-identified applications, including the specifications, drawings and claims are incorporated herein by reference in their entirety.

FIELD

One or more exemplary embodiments disclosed herein relate generally to any multimedia data coding and, more particularly, to image and video coding that divides a picture into several tiles regions.

BACKGROUND

State-of-the-art video coding schemes, such as the upcoming HEVC (High-Efficiency Video Coding), supports splitting a picture into smaller rectangular units called tiles units. Each tile units can be independently encoded and decoded by separate encoders and decoders, respectively. The primary purpose of tiles units is to allow parallel processing of the picture to reduce implementation cost and complexity.

The method to split a picture into smaller tiles in the prior art is to cut the picture horizontally into columns first and then vertically into rows. This method of splitting the picture is shown in FIG. 13. By splitting the picture in this manner, transmitting all the column widths and then all the row heights will be sufficient to define the tiles region in a picture.

In the tiles coding scheme used in prior art, the tiles units are coded separately and the spatial dependency between tiles can be removed. However, the inter prediction of the tiles can go across the tiles region in the reference pictures.

SUMMARY

Technical Problem

The method to split the picture column wise and then row wise into tiles is useful for parallel processing but not if tiles coding is used to define a sub-picture region. FIG. 4 shows a method to split the picture into 3 regions where the top-left region is a largest tile region containing a sub-picture. The problem with the prior art scheme is that the picture has to be split into 4 regions where the bottom tile region needs to be split into two regions and thus reduces the coding efficiency of the bottom tile.

The second problem with the prior art is that the inter prediction of the tiles may go across the pre-defined tiles regions in the reference picture. And thus it is not possible to decode only one of the tile regions of the picture to produce smaller resolution pictures from the coded bitstream.

Solution to Problem

One non-limiting and exemplary embodiment provides a new method of splitting the picture into tiles unit and a new method to constrain motion prediction across tile regions.

In one general aspect, the techniques disclosed here feature a method of encoding video using tiles coding scheme including: splitting an image into a plurality of tiles; writing a parameter into a header of video stream representing a number for said plurality of tiles; writing parameters into said header of video stream representing a separate width parameter and a separate height parameter of each tile region within said picture; encoding each tile region into coded tile units independently without spatial dependency with other tiles; and writing said coded tile units into a single video stream in an order based on the position of the tile regions scanned in a raster scan order within a picture.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

Methods and apparatuses according to one or more exemplary embodiments or features disclosed herein contribute to improvement in coding efficiency and in the form of adding new functionality for partial bitstream decoding.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 19B is a block diagram showing an example of a configuration of a cellular phone.

FIG. 20 illustrates a structure of multiplexed data.

FIG. 23 shows a structure of TS packets and source packets in the multiplexed data.

FIG. 31 shows an example of a look-up table in which video data standards are associated with driving frequencies.

DESCRIPTION OF EMBODIMENTS

A new method of splitting the picture into tiles unit and a new method to constrain motion prediction across tile regions are introduced.

What is novel about this disclosure is that this disclosure allows a more flexible method to split a picture into tiles region, provides a new functionality to extract a sub bitstream from a coded bistream and provides a new functionality to perform partial decoding of a coded bitstream to produce smaller resolution pictures.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Embodiment (I & II)

Video Encoder Block Diagram

Figure 1:
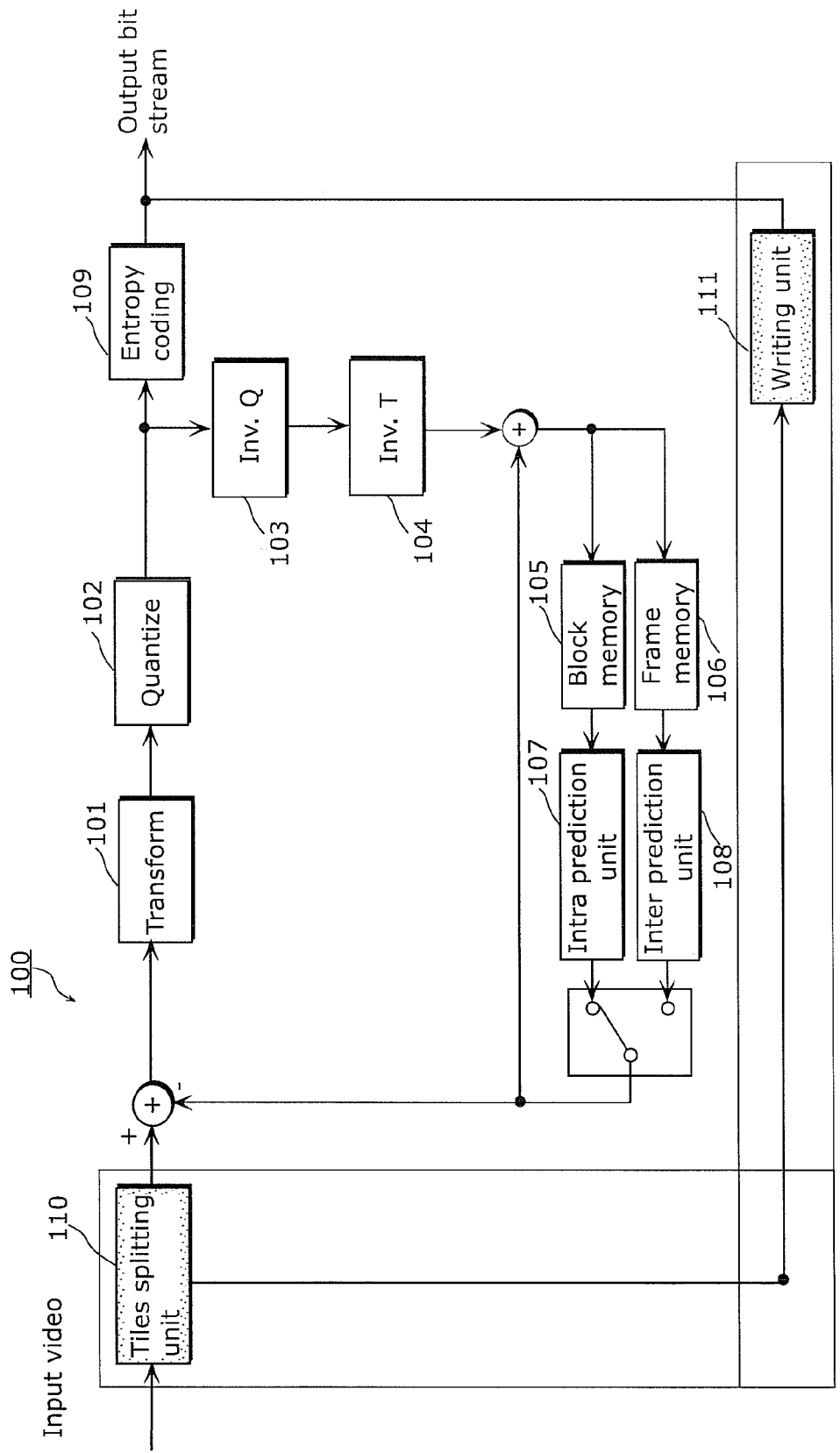
FIG. 1 is a block diagram illustrating an example apparatus for a video encoder of the present disclosure.

FIG. 1 is a block diagram which shows a structure of video/image encoding apparatus in an embodiment of the present disclosure.

The video encoding apparatus is an apparatus for encoding an input video/image bit stream on a block-by-block basis so as to generate an encoded output bit stream. As shown in FIG. 1, the apparatus comprises of a transformation unit 101, a quantization unit 102, an inverse quantization unit 103, an inverse transformation unit 104, a block memory 105, a frame memory 106, an intra prediction unit 107, an inter prediction unit 108, an entropy coding unit 109, a tiles splitting unit 110 and a writing unit 111.

An input video is inputted to the tiles splitting unit 110 and the latter outputs blocks of pixels scanned in the order of tiles units to an adder. The tiles splitting unit 110 also outputs the dimension of the tile regions and the flags for disabling motion prediction across tile regions to the writing unit 111. The writing unit 111 then outputs the inputted parameters into the headers of a bit stream.

After the blocks of pixels are inputted to an adder, and outputs blocks of added values to the transformation unit 101. The transformation unit 101 transforms the added values into frequency coefficients, and outputs the resulting frequency coefficients to the quantization unit 102. The quantization unit 102 quantizes the inputted frequency coefficients, and outputs the resulting quantized values to the inverse quantization unit 103 and the entropy coding unit 109. The entropy coding unit 109 encodes the quantized values outputted from the quantization unit 102, and outputs a bit stream.

The inverse quantization unit 103 inversely quantizes the sample values outputted from the quantization unit 102, and outputs the frequency coefficients to the inverse transformation unit 104. The inverse transformation unit 104 performs inverse frequency transform on the frequency coefficients so as to transform the frequency coefficients into sample values of the bit stream, and outputs an adder. The adder adds the sample values of the bit stream outputted from the inverse transformation unit 104 to the predicted video/image values outputted from the inter/intra prediction unit 107, 108, and outputs the resulting added values to the bock memory 105 or the frame memory 106 for further prediction. The inter/intra prediction unit 107, 108 searches within reconstructed videos/images stored in the block memory 105 or the frame memory 106, and estimates a video/image area which is e.g. most similar to the input videos/images for prediction.

Embodiment (I)

Syntax

Figure 5A:
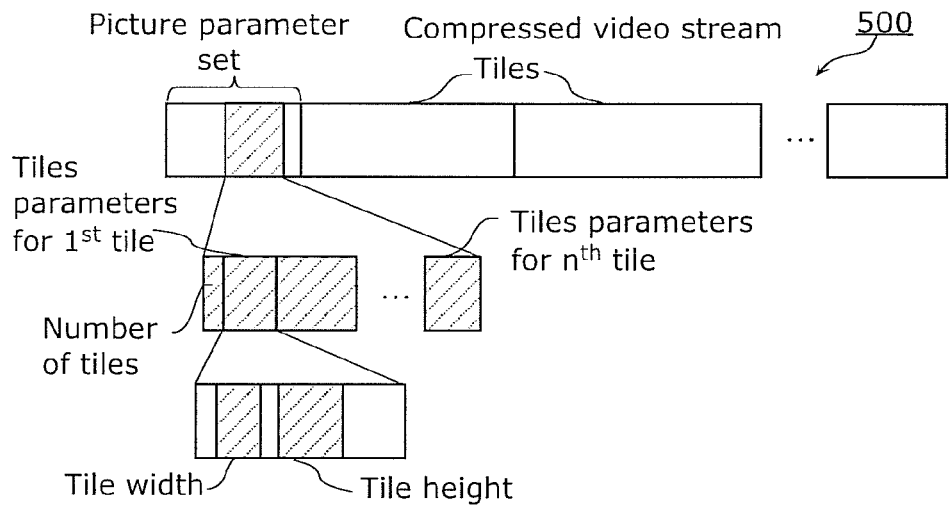
FIG. 5A is a diagram showing the locations of the tile width and tile height for each tile units in a picture parameter set in a compressed video stream.
Figure 5B:
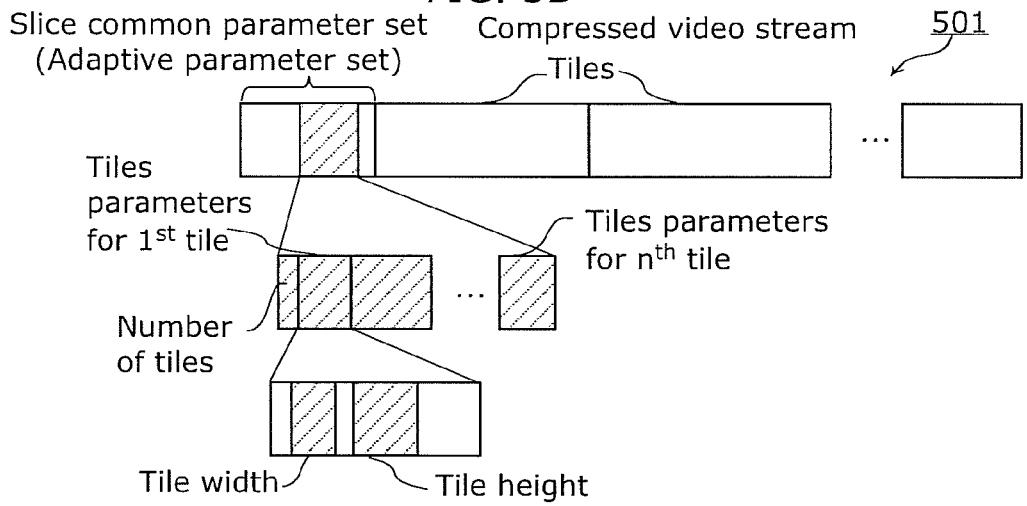
FIG. 5B is a diagram showing the locations of the tile width and tile height for each tile units in a slice common parameter set in a compressed video stream.
Figure 5C:
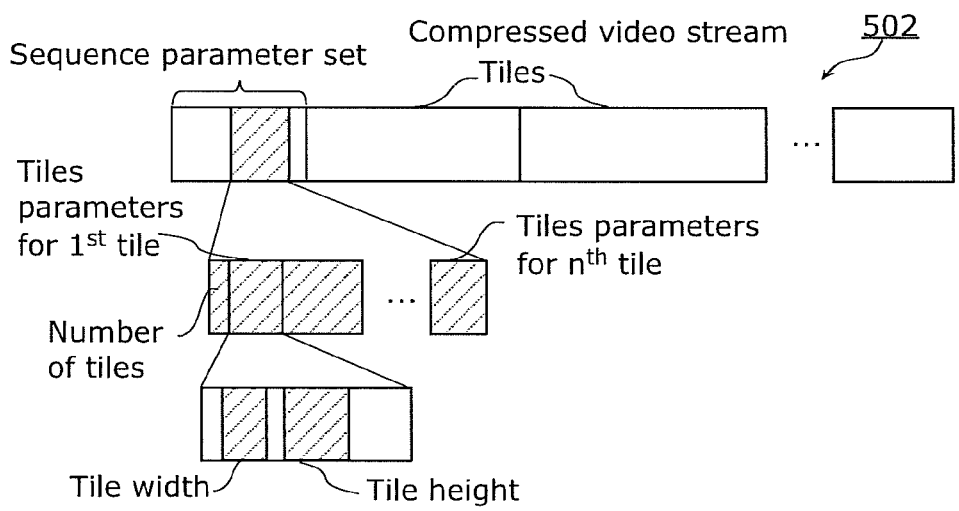
FIG. 5C is a diagram showing the locations of the tile width and tile height for each tile units in a sequence parameter set in a compressed video stream.

FIG. 5A to FIG. 5C are syntax diagrams which show locations of the tile parameters for each tile unit in example embodiments of the present disclosure.

In FIG. 5A, the tile parameters can be located in a picture parameter set. The tile parameters in the picture parameter set comprises of a parameter for the number of tiles and tile parameters for each tile unit. The tile parameter for each tile unit comprises of a tile width and a tile height which specifics the dimension of the tile region for each tile unit.

In FIG. 5B, the tile parameters can be located in a slice common parameter set. Another possible name for slice common parameter set is adaptive parameter set where a plurality of slices uses the same parameters in this parameter set. The tile parameters in the slice adaptive parameter set comprises of a parameter for the number of tiles and tile parameters for each tile unit. The tile parameter for each tile unit comprises of a tile width and a tile height which specifies the dimension of the tile region for each tile unit.

In FIG. 5C, the tile parameters can be located in a sequence parameter set. The tile parameters in the sequence parameter set comprises of a parameter for the number of tiles and tile parameters for each tile unit. The tile parameter for each tile unit comprises of a tile width and a tile height which specifics the dimension of the tile region for each tile unit.

Next, a description is given as to the operations of the video coding apparatus 100 as mentioned above.

Embodiment (I)

Encoding Flow Chart

Figure 7:
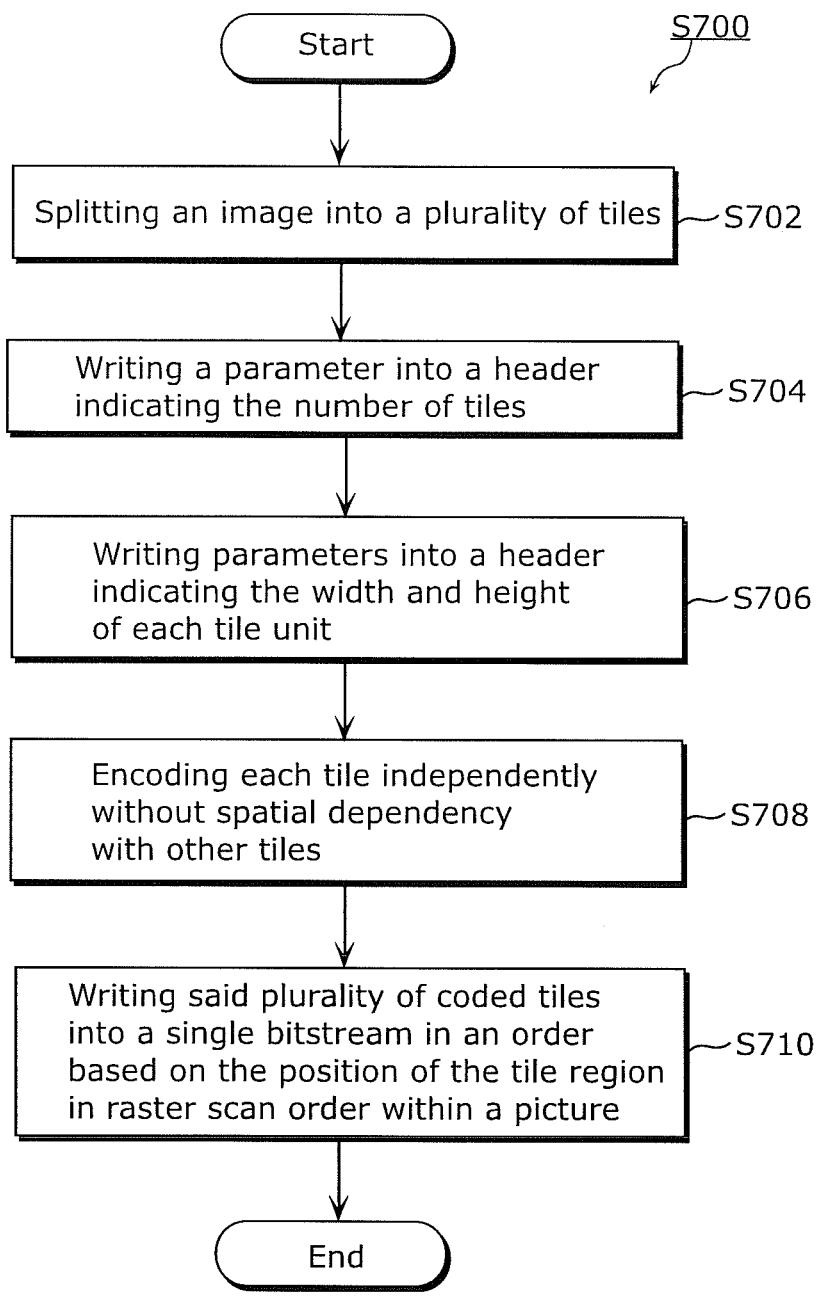
FIG. 7 is a flowchart showing video encoding process using the first embodiment of the present disclosure.

FIG. 7 is a flowchart (S700) which shows a sequence of operations for encoding method/steps of the video/image encoding apparatus 100 in the first embodiment of the present disclosure.

At Step S702, an image is split into a plurality of tile regions. At Step S704, a parameter representing the number of tile regions is written into a header of video stream. Then, at Step S706, the width parameter and the height parameter for each tile region are written into a header of video stream. And at Step S708, each tile region is independently encoded without spatial dependency with other tile regions. Finally in Step S710, a plurality of coded tiles units is written into video stream in an order based on raster scan order of the tile regions within a picture.

The effect of the present disclosure is in the form of better flexibility in splitting an image into tile regions. Using the present disclosure, an image can be split into tile regions in a more flexible manner by signaling the dimensions of each tile region separately. The present disclosure provides a more flexible way to define tile region and thus reduces the overhead caused by defining unnecessary tile regions.

Embodiment (II)

Syntax

Figure 6:
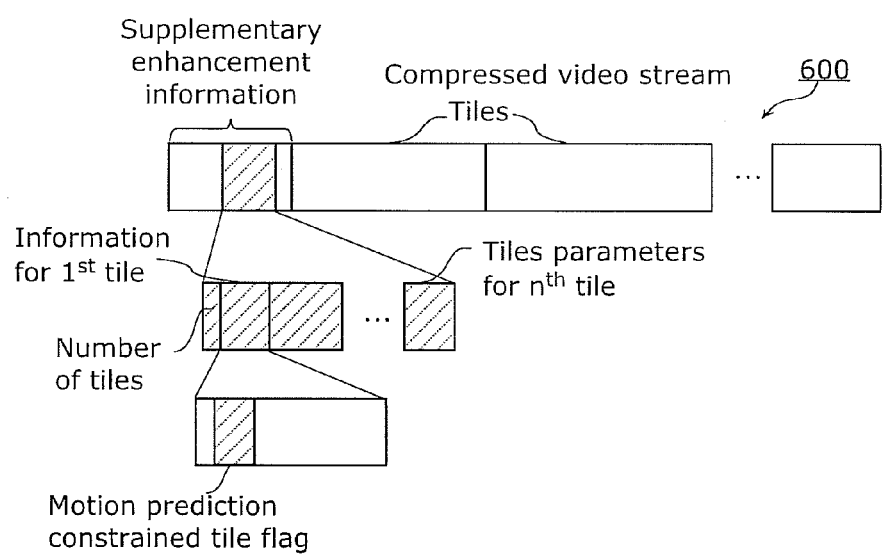
FIG. 6 is a diagram showing the locations of the motion prediction constrained tile flag for each tile units in a SEI (Supplementary Enhancement Information) message in a compressed video stream.

FIG. 6 is a syntax diagram which shows of locations of the flag for constraining motion prediction for each tile unit in example embodiments of the present disclosure.

In FIG. 6, the tile parameters are located in supplementary enhancement information message. The tile parameters in supplementary enhancement information message comprises of a parameter for the number of tile regions in a picture and parameters related to each tile region. The tile parameter for each tile region comprises of a flag representing the switch to enable or to disable a constraint for motion prediction across tile region.

Figure 8:
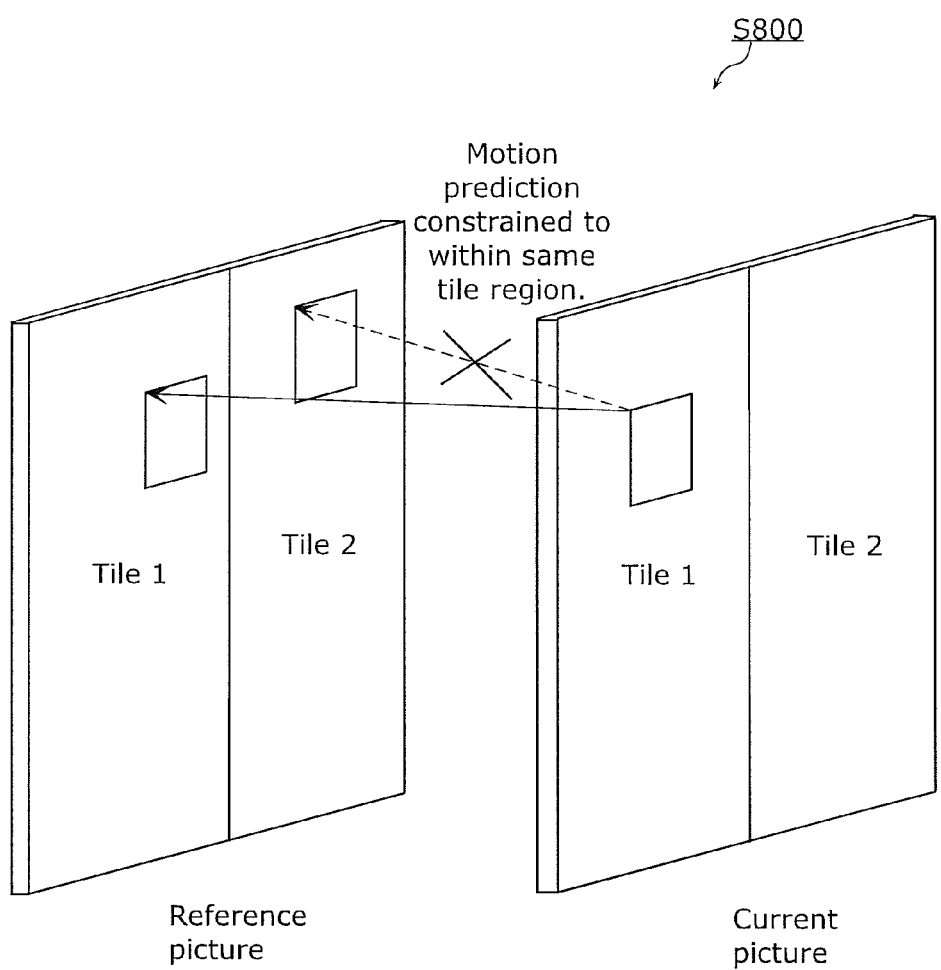
FIG. 8 is a diagram showing that motion prediction is constrained to the same tile region in the reference pictures in the second embodiment of the present disclosure.

FIG. 8 shows an example illustration of constraining motion prediction to the same tile region in the reference pictures. The motion prediction is constrained in the manner that only samples within the same tile region in the reference pictures can be used for prediction.

Next, a description is given as to the operations of the video coding apparatus 100 as mentioned above.

Embodiment (II)

Encoding Flow Chart

Figure 9:
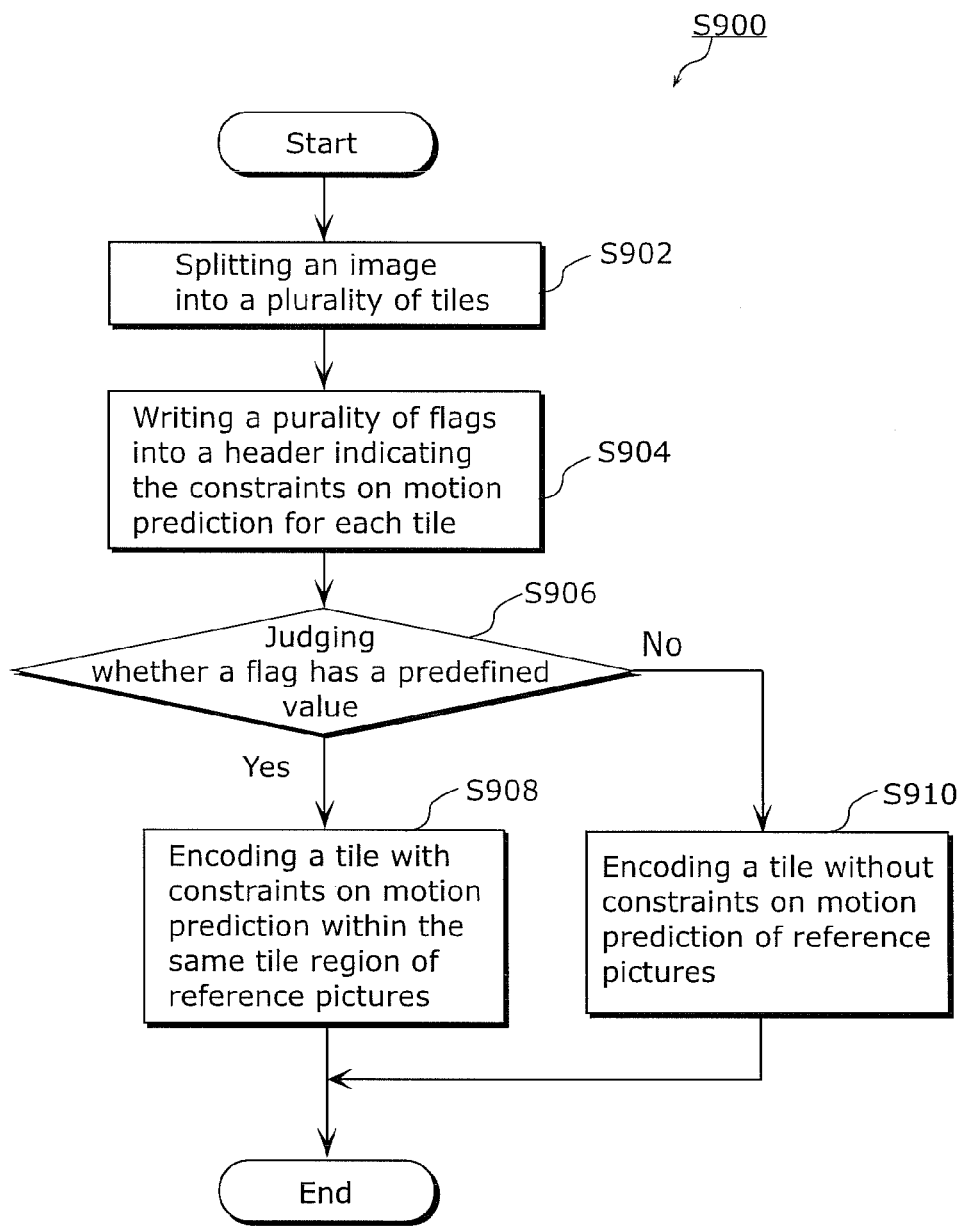
FIG. 9 is a flowchart showing video encoding process using the second embodiment of the present disclosure.

FIG. 9 is a flowchart (S900) which shows a sequence of operations for encoding method/steps of the video/image encoding apparatus 100 in the second embodiment of the present disclosure.

At Step S902, an image is split into a plurality of tile regions. At Step S904, a parameter representing the number of tile regions is written into a header of video stream. Similarly, at Step S906, a flag for each tile region representing whether a constraint has been applied to motion prediction is written into a header of video stream.

And at Step S906, a judgment is made to determine if each flag has a pre-defined value. If a flag is judged to have a predefined value, a tile region is encoded with constraints on the motion prediction to predict only from the same tile region in reference pictures at Step S908. Otherwise, at Step S910, a tile region is encoded without the constraints on the motion prediction to stay within the same tile region in the reference pictures.

The effect of the present disclosure is in the form of providing the functionality to encode tile regions without dependency temporally across different tile regions. Thus the present disclosure allows a video stream to be structured such that a region of the pictures can be decoded and reconstructed without the decoding of the full video stream. The partial reconstructed video is a smaller resolution video having the same frame rates as the full resolution video.

Embodiment (III, IV & V)

Decoder Block Diagram

Figure 2:
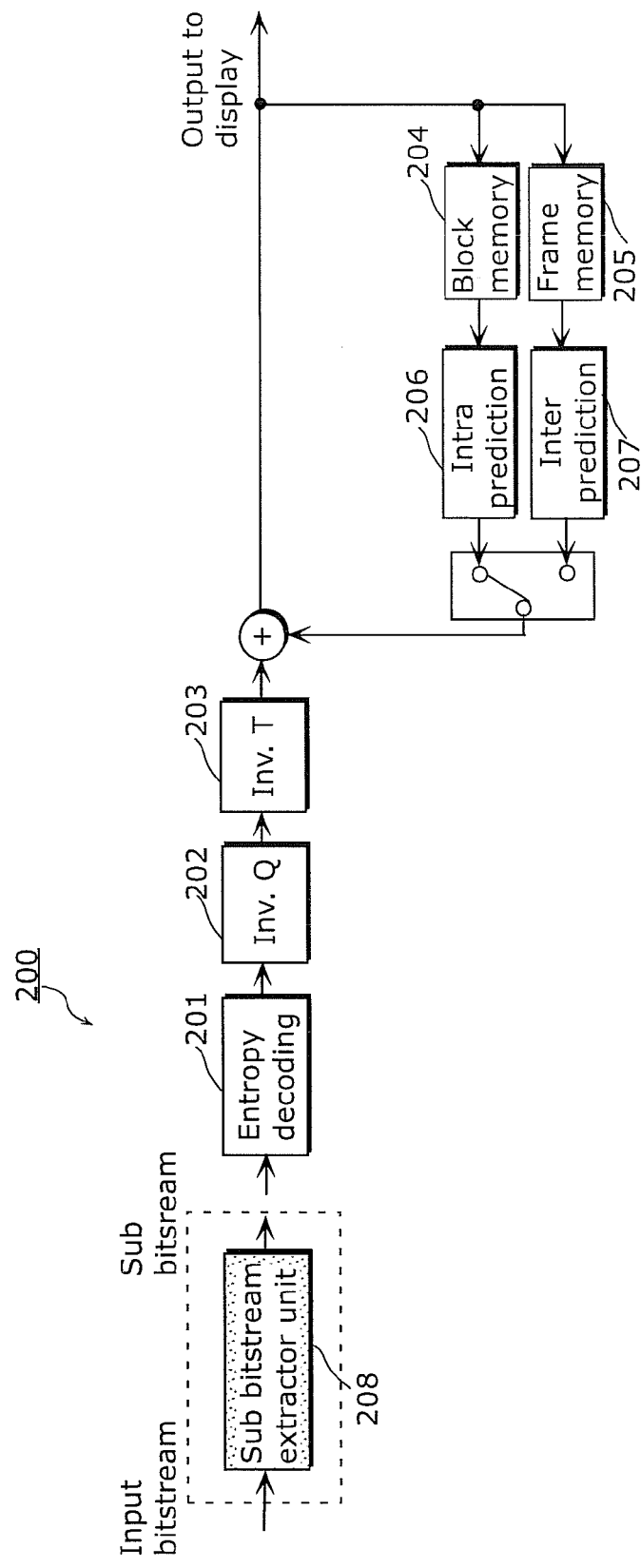
FIG. 2 is a block diagram illustrating an example apparatus for a sub bitstream extractor and a video decoder of the present disclosure.

FIG. 2 is a block diagram which shows a structure of video decoding apparatus 200 in an embodiment of the present disclosure.

The video decoding apparatus 200 is an apparatus for decoding an input coded bit stream on a block-by-block basis and outputting videos/images, and comprises as shown in FIG. 2, an entropy decoding unit 201, an inverse quantization unit 202, an inverse transformation unit 203, an block memory 204, an frame memory 205, an intra prediction unit 206, an inter prediction unit 207 and a sub bit stream extractor unit 208. In another possible embodiment of the present disclosure, the sub bit stream extractor unit 208 is another separate apparatus from the video decoding apparatus.

An input encoded bit stream is inputted to the sub bit stream extractor unit 208 and outputs a sub bit stream. The sub bit stream is then inputted to the entropy decoding unit 201.

After the input encoded bit stream is inputted to the entropy decoding unit 201, the entropy decoding unit 201 decodes the input encoded bit stream, and outputs the decoded values to the inverse quantization unit 202. The inverse quantization unit 202 inversely quantizes the decoded values, and outputs frequency coefficients to the inverse transformation unit 203. The inverse transformation unit 203 performs inverse frequency transform on the frequency coefficients to transform the frequency coefficients into sample values, and outputs the resulting pixel values to an adder. The adder adds the resulting pixel values to the predicted video/image values outputted from the intra/inter prediction unit 206, 207, and outputs the resulting values to display, and outputs the resulting values to the block memory 204 or the frame memory 205 for further prediction. In addition, the intra/inter prediction unit 206, 207 searches within videos/images stored in the block memory 204 or frame memory 205, and estimates a video/image area which is e.g. most similar to the decoded videos/images for prediction.

Figure 3:
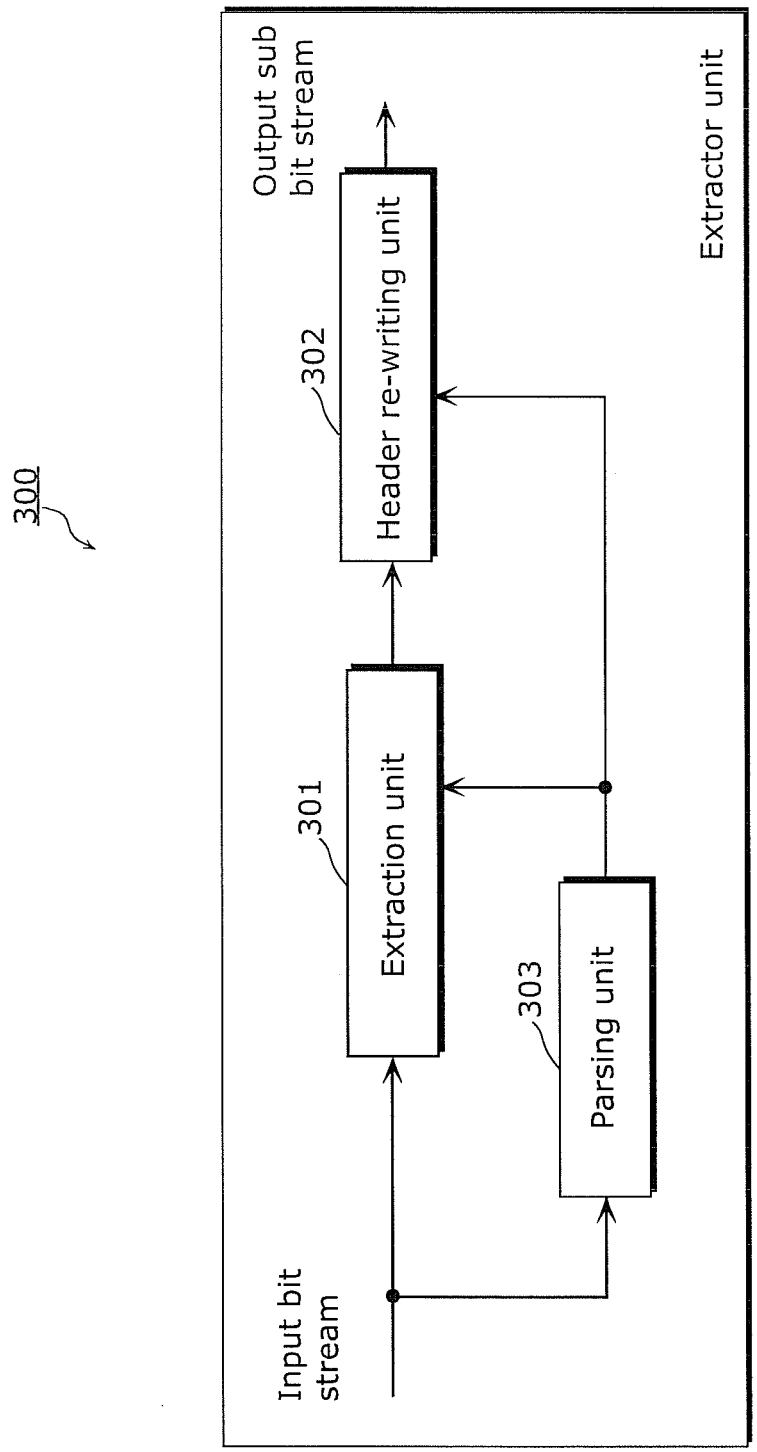
FIG. 3 is a block diagram illustrating an example apparatus for a sub bitstream extractor and a video decoder of the present disclosure.
Figure 4:
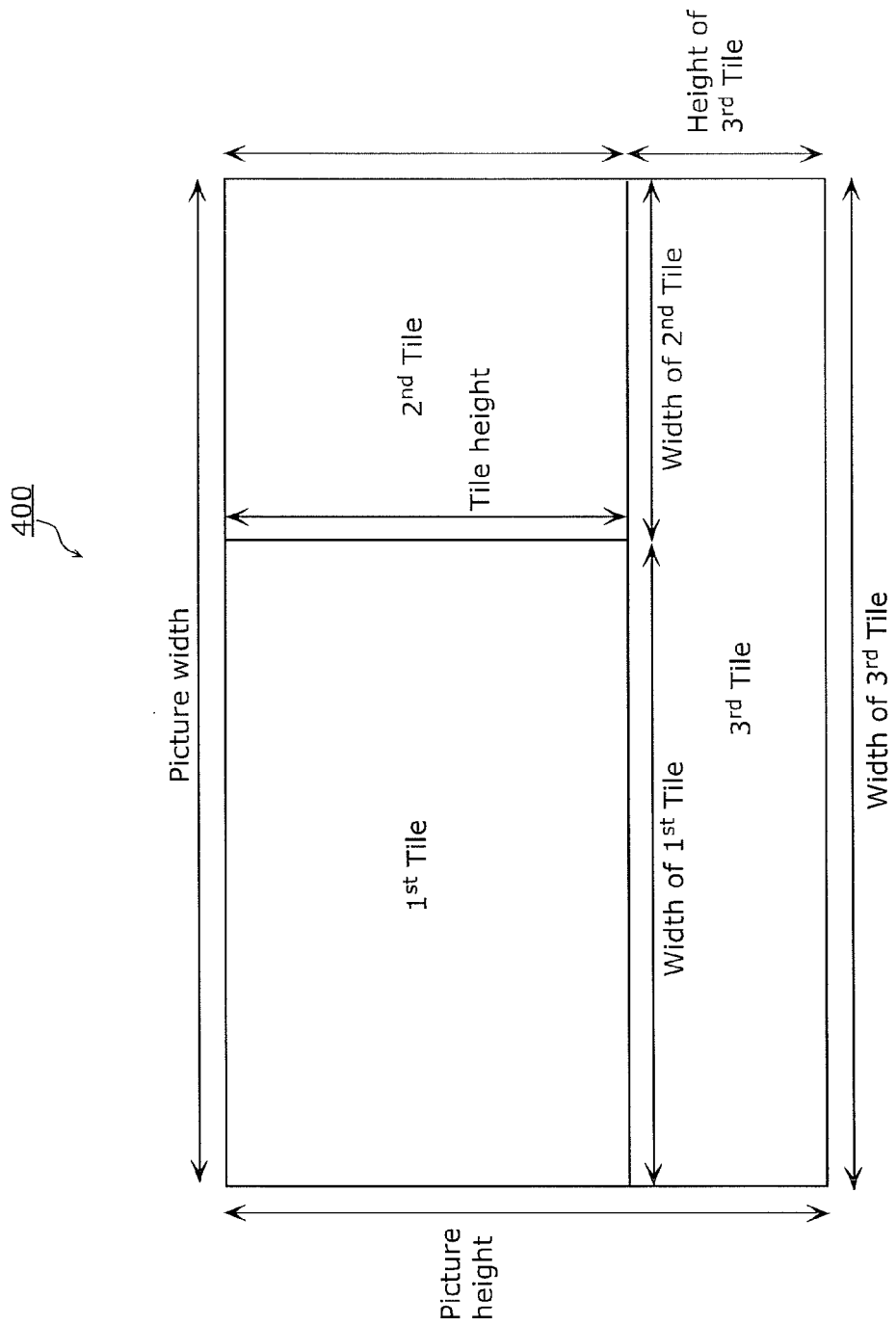
FIG. 4 is a diagram illustrating an example of splitting a picture into three tiles regions with different width and height for each region.

FIG. 3 is a block diagram which shows a structure of sub bit stream extractor unit 208 in an embodiment of the present disclosure.

The sub bit stream extractor unit 208 is an apparatus for extracting a sub bit stream from an input bit stream, and comprises as shown in FIG. 3, an extraction unit 301, a parsing unit 303 and an optional header re-writing unit 302.

An input encoded bit stream is inputted to parsing unit 303 and outputs parameters to the extraction unit 301 that includes the dimensions of the tile regions and flags that represent constraints on motion prediction. The input encoded bit stream and the parsed parameters are inputted to the extraction unit 301 and a part of the bit stream is outputted. The partial bit stream and the parsed parameters are then inputted to the optional header re-writing unit 302 and a bit stream containing the modified parameters in the headers is outputted.

Next, a description is given as to the operations of the video decoding apparatus 200 as mentioned above.

Embodiment (III)

Decoding Flow Chart

Figure 10:
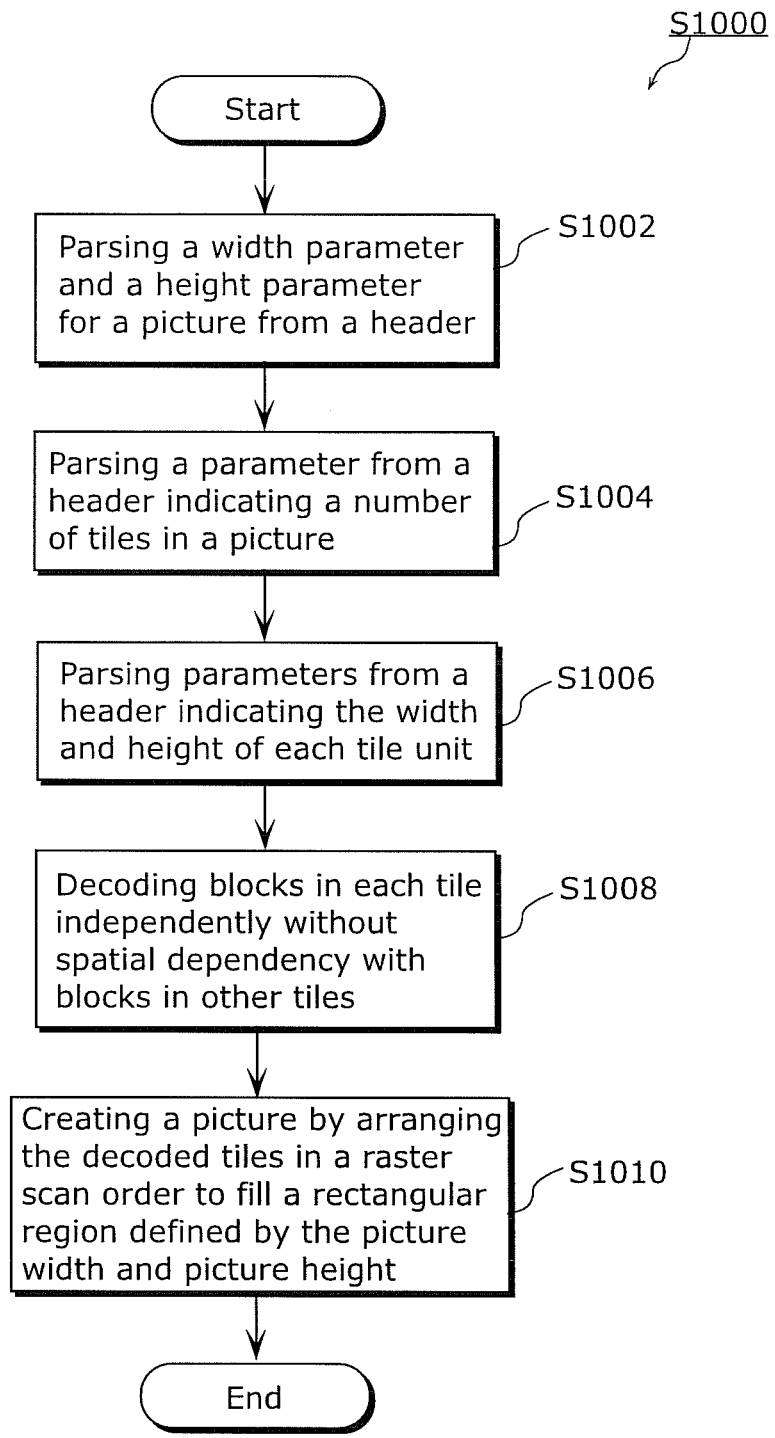
FIG. 10 is a flowchart showing video decoding process using the third embodiment of the present disclosure.

FIG. 10 is a flowchart (S1000) which shows a sequence of operations for decoding method/steps of the video/image decoding apparatus 200 in the third embodiment of the present disclosure.

At Step S1002, a width parameter and a height parameter for a picture is parsed from a header of the video stream. The picture width and height parameters can be located in a sequence parameter set. At Step S1004, a parameter indicating the number of tile regions within a picture is parsed from a header of the video stream. Then, at Step S1006, the width parameter and height parameter for each tile region are parsed from a header of the video stream. And at Step S1008, blocks in a tile region are decoded and reconstructed independently without spatial dependency with blocks in a different tile region. And finally at Step S1010, a picture is reconstructed based on the decoded tiles by placing the reconstructed tile regions in specific positions defined by their parsed width and height parameters and the parsed picture width and parsed picture height. The reconstructed tiles are arranged in a raster scan order to fill a rectangular region defined by the picture width and picture height.

The effect of the present disclosure is in the form of reduce complexity by allowing parallel processing of a picture. Using the present disclosure, tiles with different rectangular dimensions can be decoded using parallel processing and a picture can be re-created by re-arranging the tiles in a raster scan order to fill the picture region defined by a picture width and height.

Embodiment (IV)

Decoding Flow Chart

Figure 11:
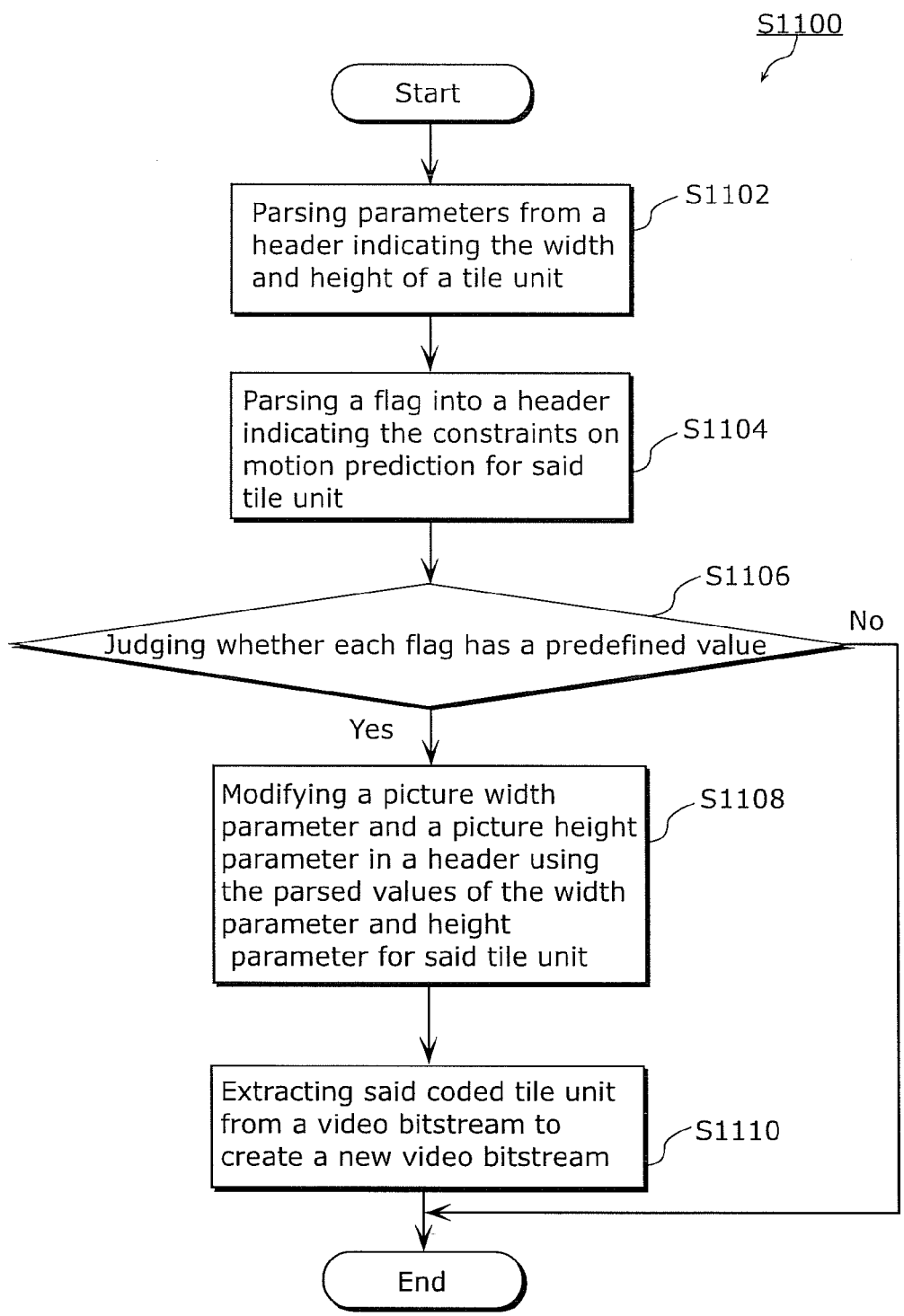
FIG. 11 is a flowchart showing video extraction process using the fourth embodiment of the present disclosure.

FIG. 11 is a flowchart (S1100) which shows a sequence of operations for decoding method/steps of the video/image decoding apparatus 200 in the fourth embodiment of the present disclosure.

At Step S1102, the width parameter and height parameter for a tile region are parsed from a header of the video stream. At Step S1104, a flag parameter is parsed from a header of the video stream representing a decision whether motion prediction is constrained for the tile region. Then at Step S1106, a judgment is made to determine if the parsed flag has a predefined value. If the parsed flag is judged to have a predefined value, at optional Step S1108, the picture width parameter and the picture height parameter are replaced with the parsed tile region width and tile region height parameters and re-written into a header of video stream. The picture width and height parameter are located in a sequence parameter set of the video stream. Finally at Step S1110, when the parsed flag is judged to have a predefined value, an encoded tile unit is extracted from the video stream to create a new video stream with the modified header.

The effect of the present disclosure is in the form of adding new functionality to allow a sub video stream to be extracted from a video stream without the decoding of the inputted video stream and the extracted video stream is able to be decoded and reconstructed by a video decoder of the present disclosure.

Embodiment (V)

Decoding Flow Chart

Figure 12:
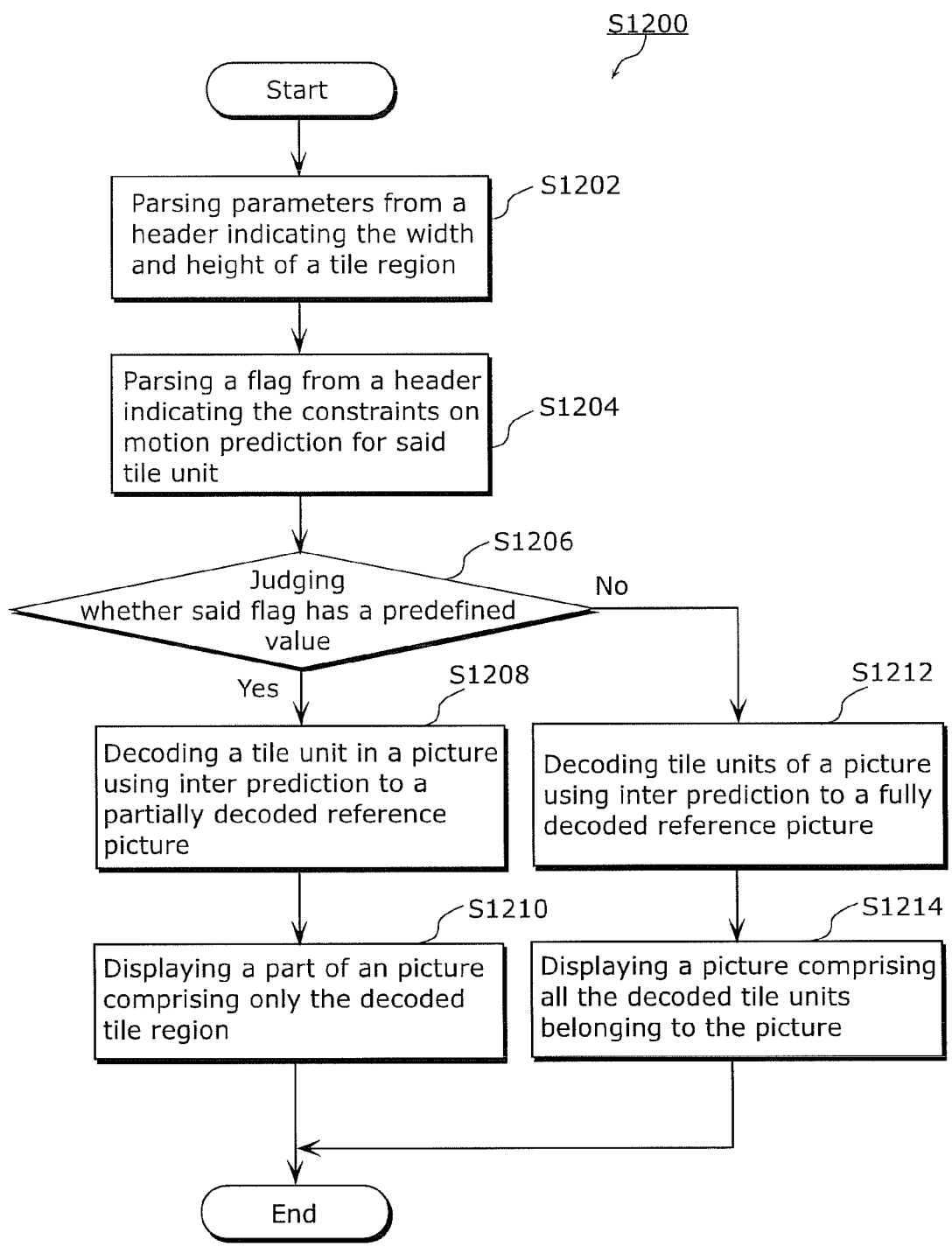
FIG. 12 is a flowchart showing video decoding process using the fifth embodiment of the present disclosure.
Figure 13:
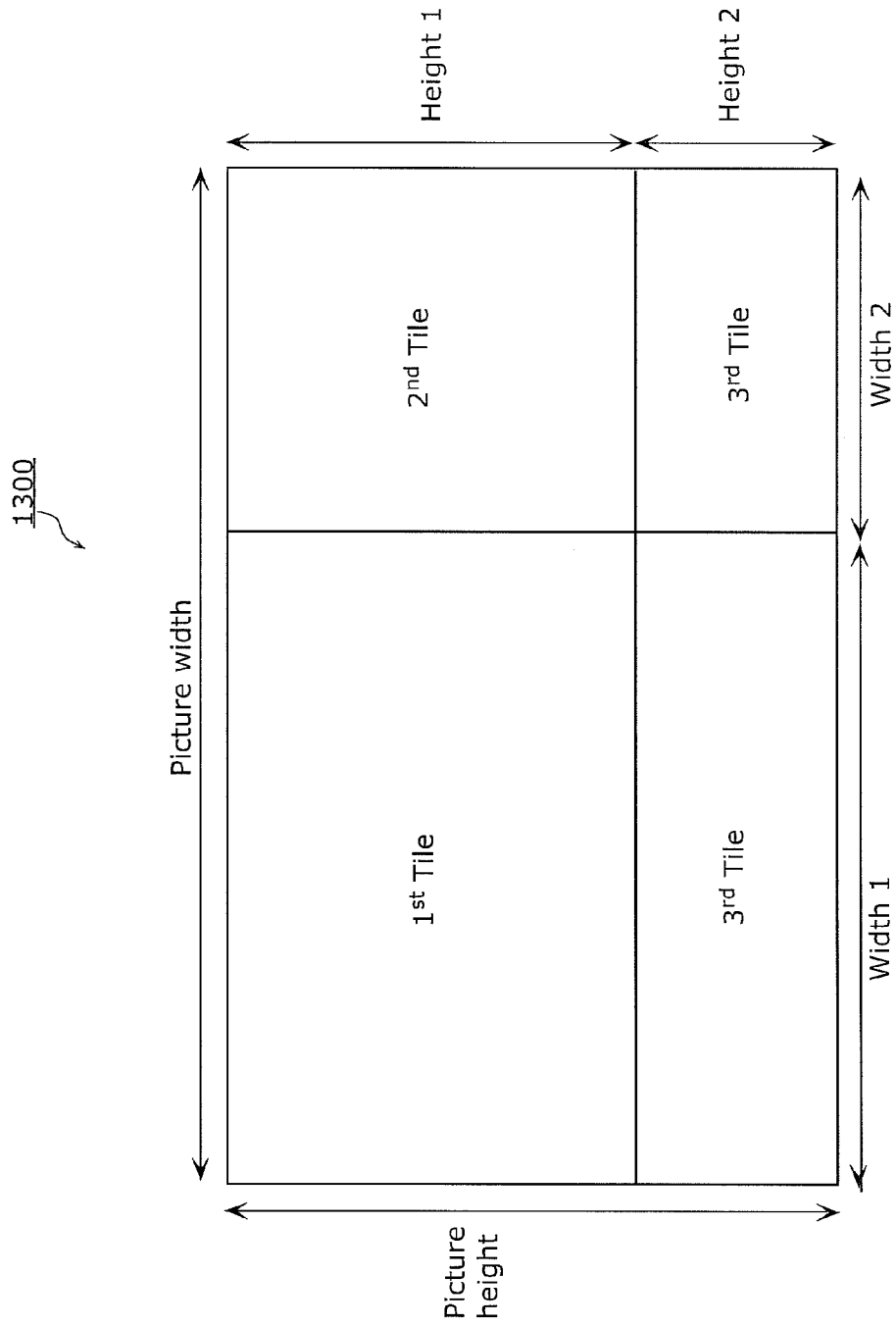
FIG. 13 is a diagram illustrating an example of splitting a picture into tiles regions as described in prior art.

FIG. 12 is a flowchart (S1200) which shows a sequence of operations for decoding method/steps of the video/image decoding apparatus 200 in the fifth embodiment of the present disclosure.

At Step S1202, the width parameter and height parameter for a tile region are parsed from a header of the video stream. At Step S1204, a flag parameter is parsed from a header of the video stream representing a decision whether motion prediction is constrained for the tile region. Then at Step S1206, a judgment is made to determine if the parsed flag has a predefined value. If the parsed flag is judged to have a predefined value, at Step S1208, a tile unit is decoded using inter picture prediction to a partially reconstructed reference picture and a part of the reconstructed picture is displayed comprising the decoded tile region only at Step S1210.

Returning to the Step S1206, if the parsed flag is judged not to have the predefined value, at Step S1212, a tile unit is decoded using inter picture prediction to a fully reconstructed reference picture and then it is followed by the displaying of a picture comprising all the decoded tile units belonging to the picture at Step S1214. In another possible embodiment of the present disclosure, returning to the Step S1206, if the parsed flag is judged not to have the predefined value, Step S1212 and Step S1214 are skipped and tile unit will not be decoded.

The effect of the present disclosure is in the form of additional decoding flexibility to allow a video decoder to perform partial decoding of a video stream to reduce complexity or to display only a region of the picture without requiring the decoding of the rest of the regions.

Embodiment 2

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 14:
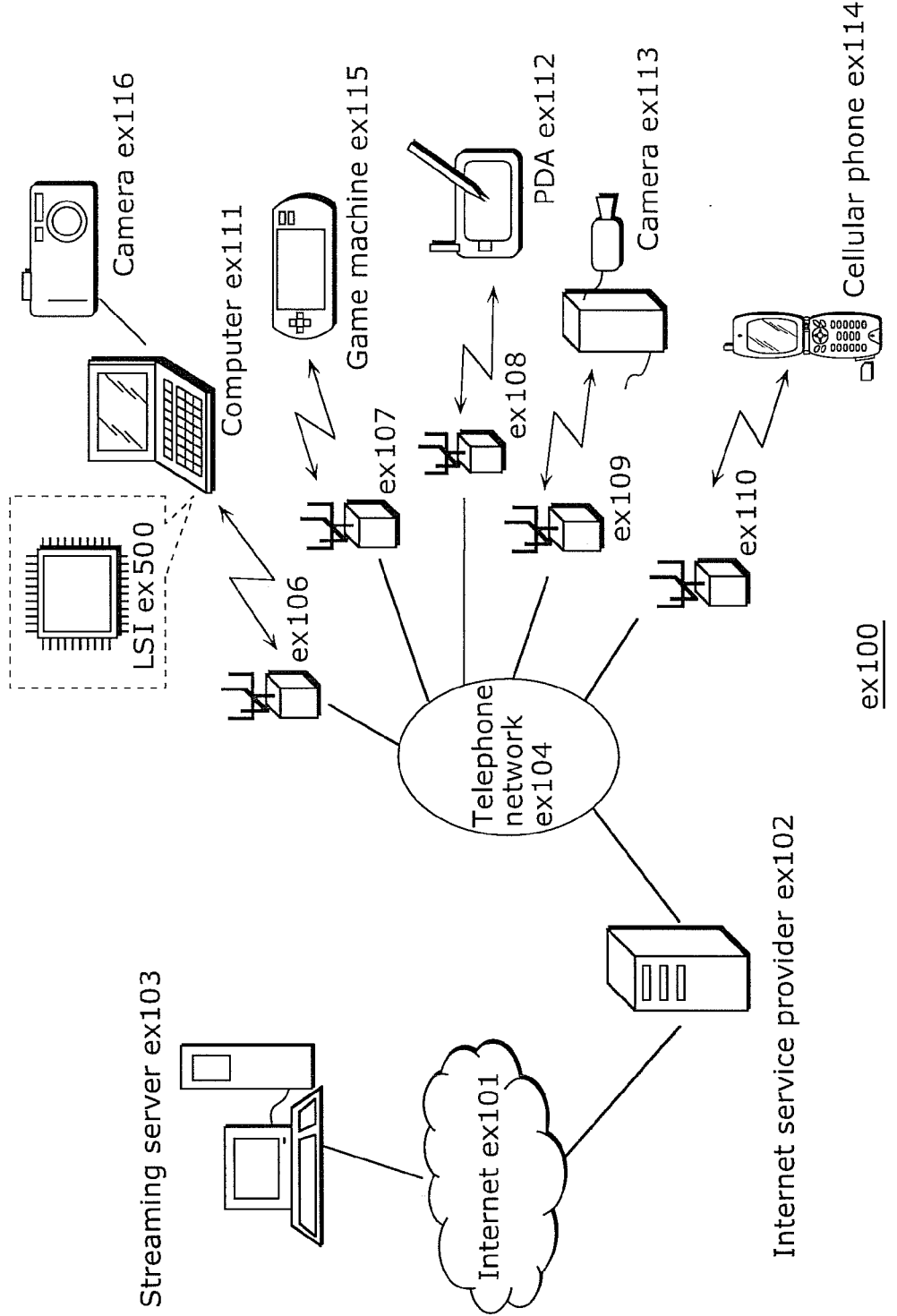
FIG. 14 shows an overall configuration of a content providing system for implementing content distribution services.

FIG. 14 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 14, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 15:
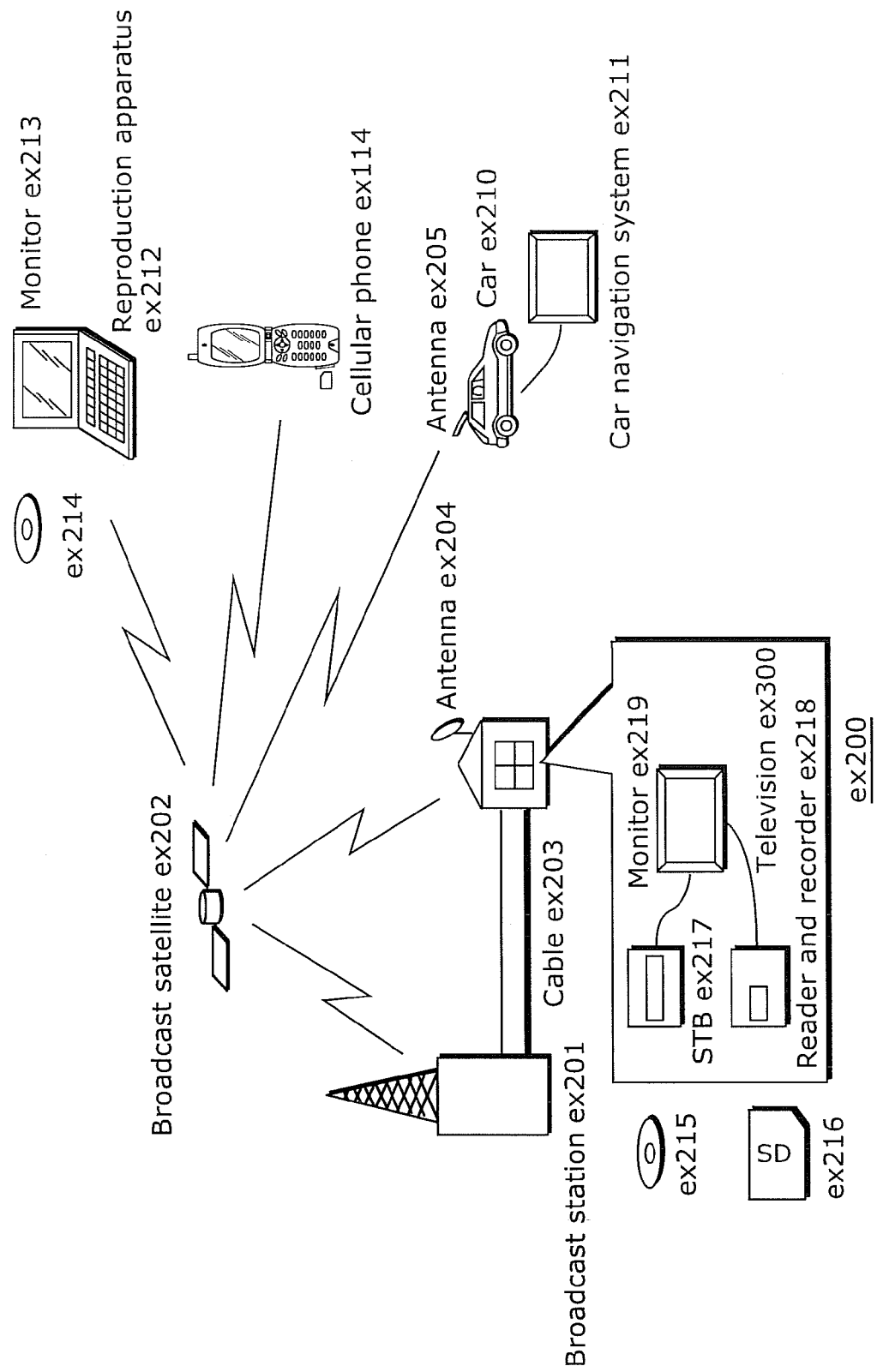
FIG. 15 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 15. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 16:
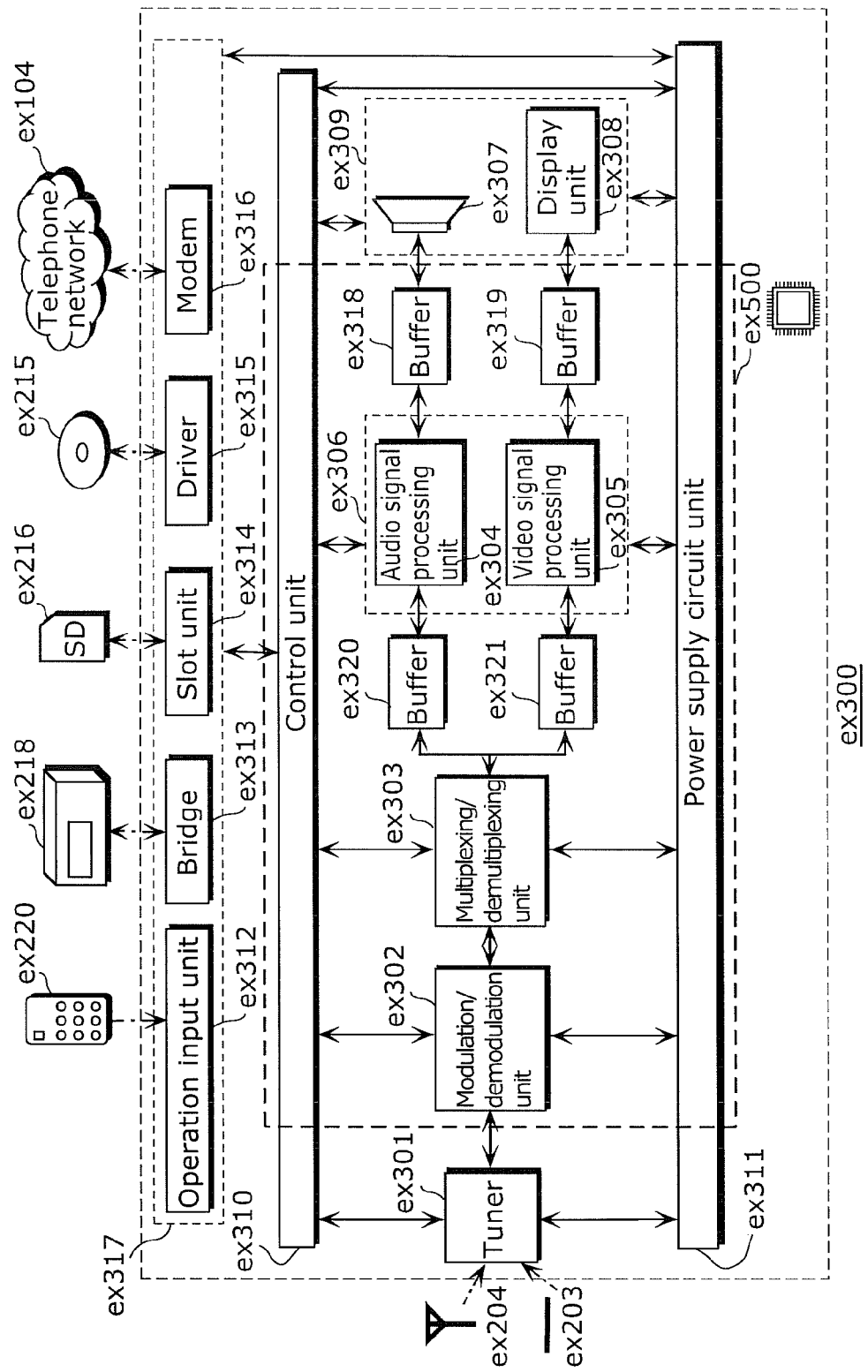
FIG. 16 shows a block diagram illustrating an example of a configuration of a television.

FIG. 16 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 17:
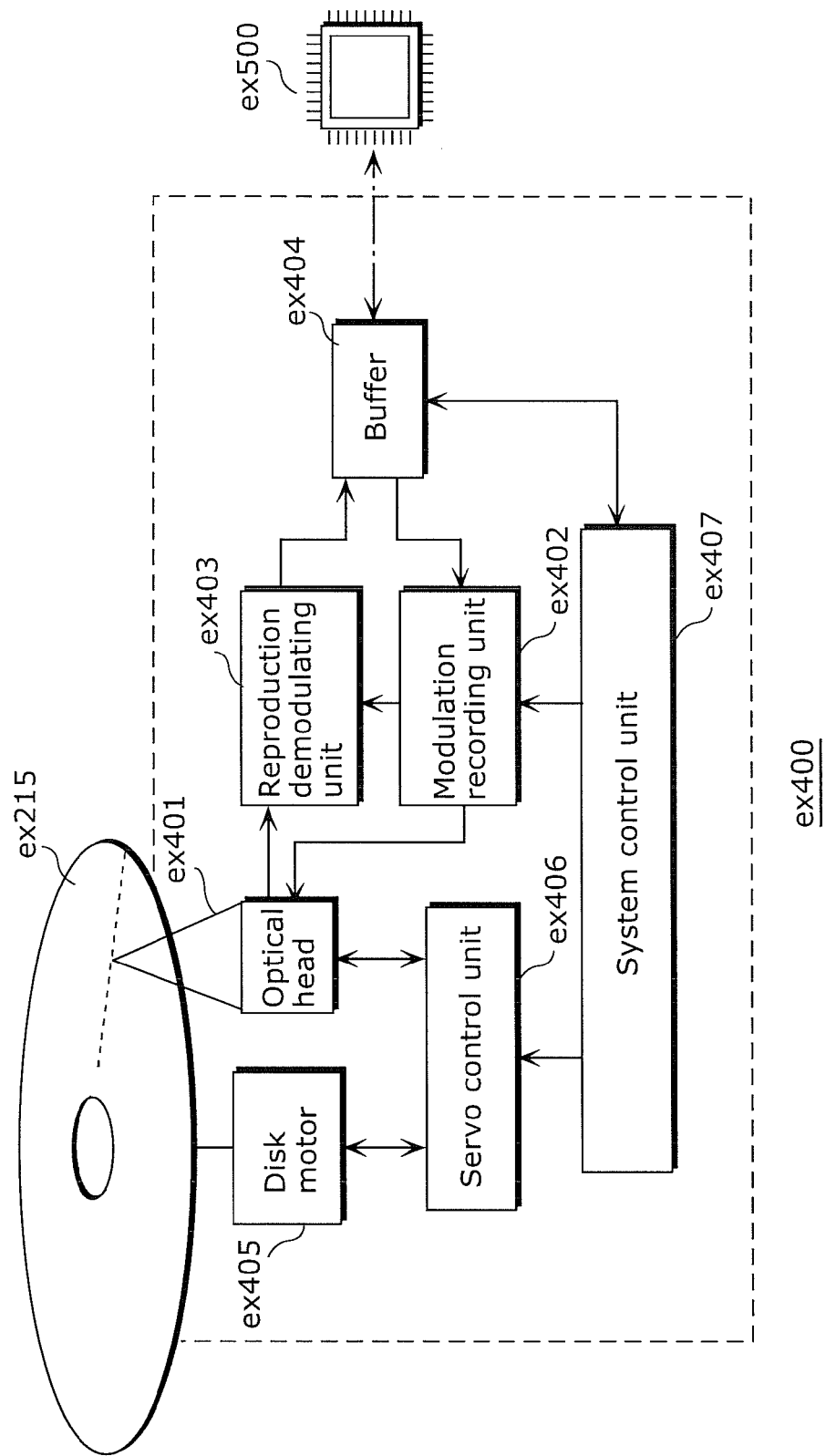
FIG. 17 shows a block diagram illustrating an example of a configuration of an information reproducing/recording unit that reads and writes information from and on a recording medium that is an optical disk.

As an example, FIG. 17 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 18:
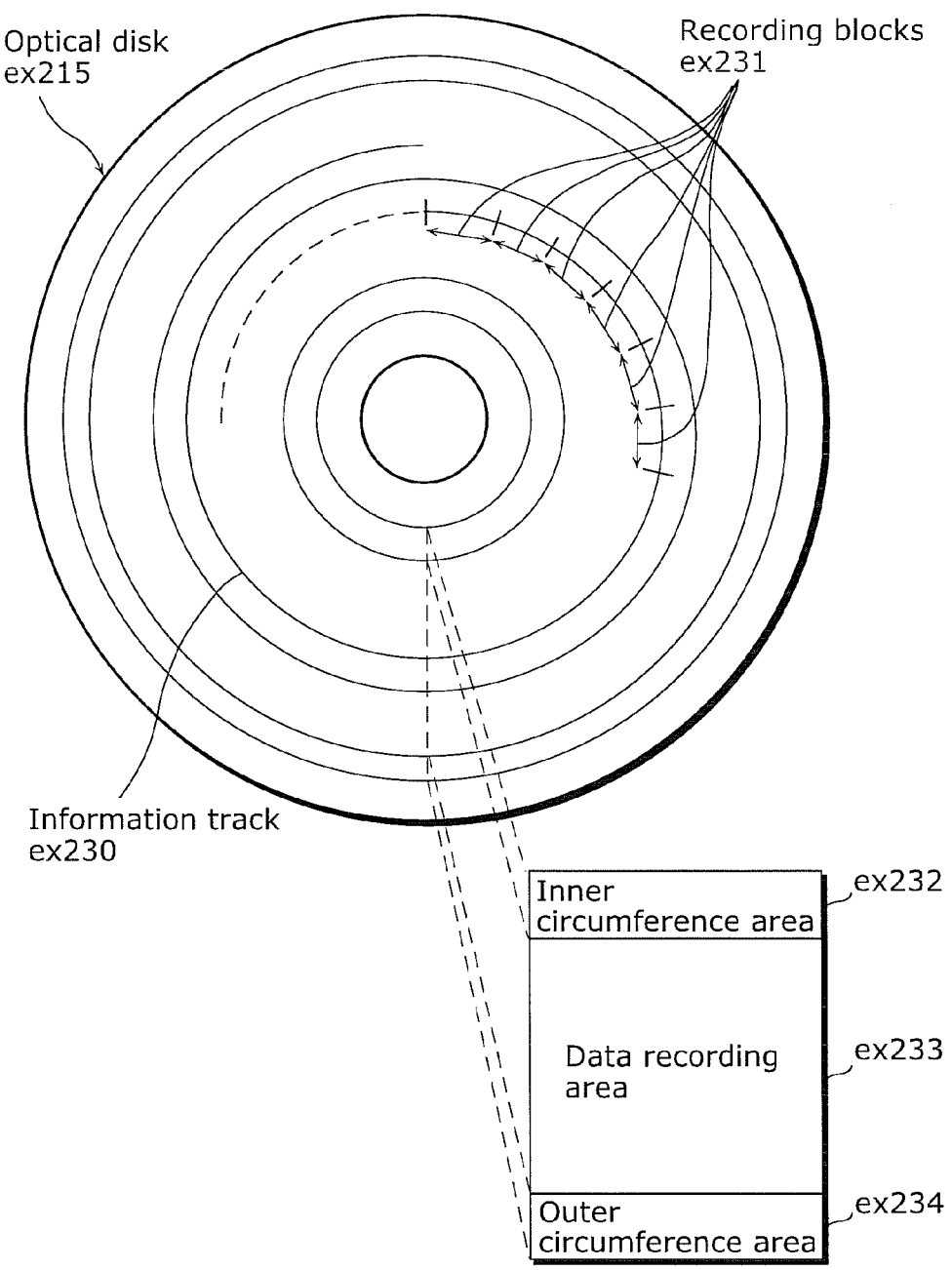
FIG. 18 shows an example of a configuration of a recording medium that is an optical disk.

FIG. 18 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 16. The same will be true for the configuration of the computer ex111, the cellular phone ex114, and others.

Figure 19A:
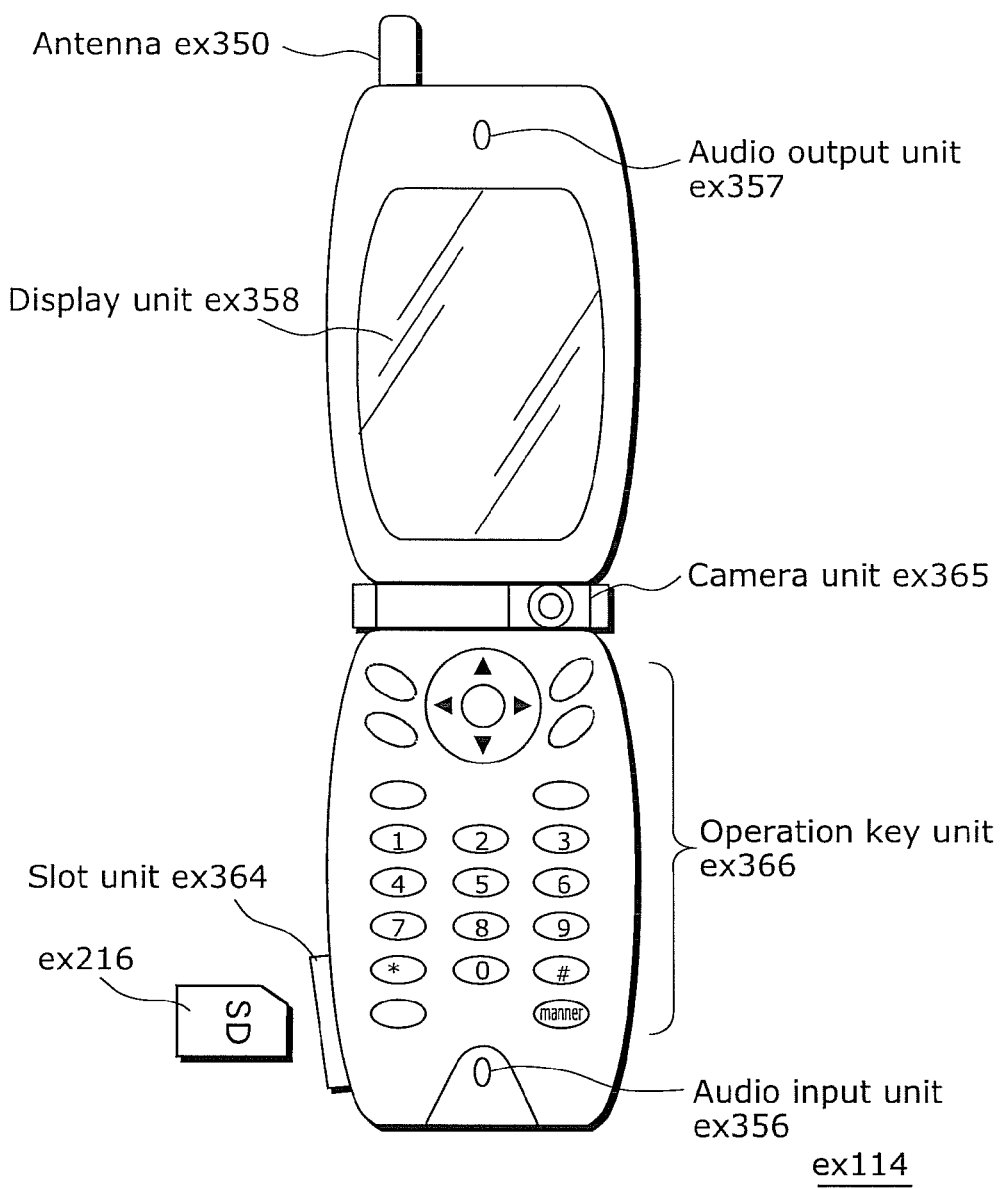
FIG. 19A shows an example of a cellular phone.

FIG. 19A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 19B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 20 illustrates a structure of the multiplexed data. As illustrated in FIG. 20, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 21:
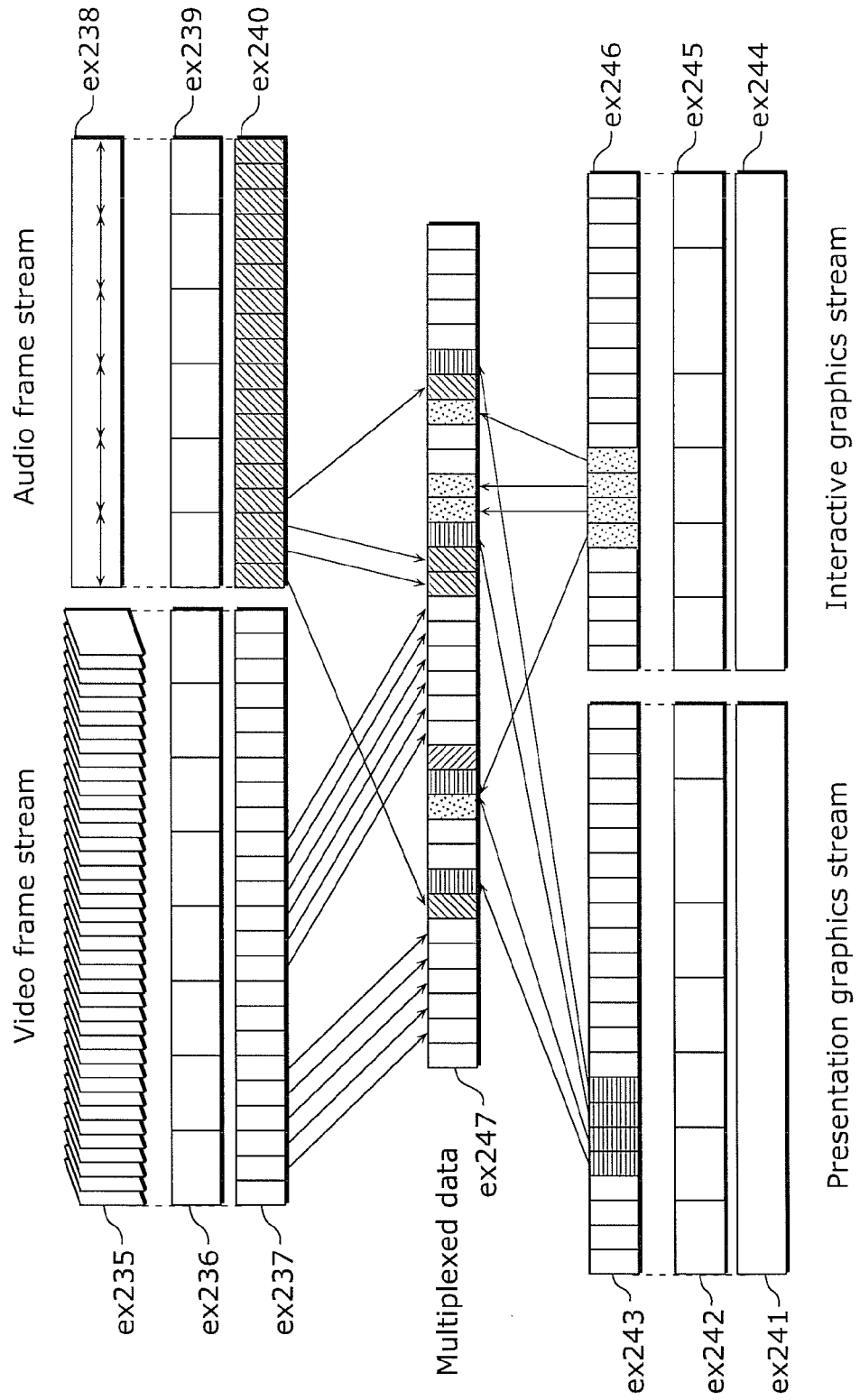
FIG. 21 schematically shows how each stream is multiplexed in multiplexed data.

FIG. 21 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 22:
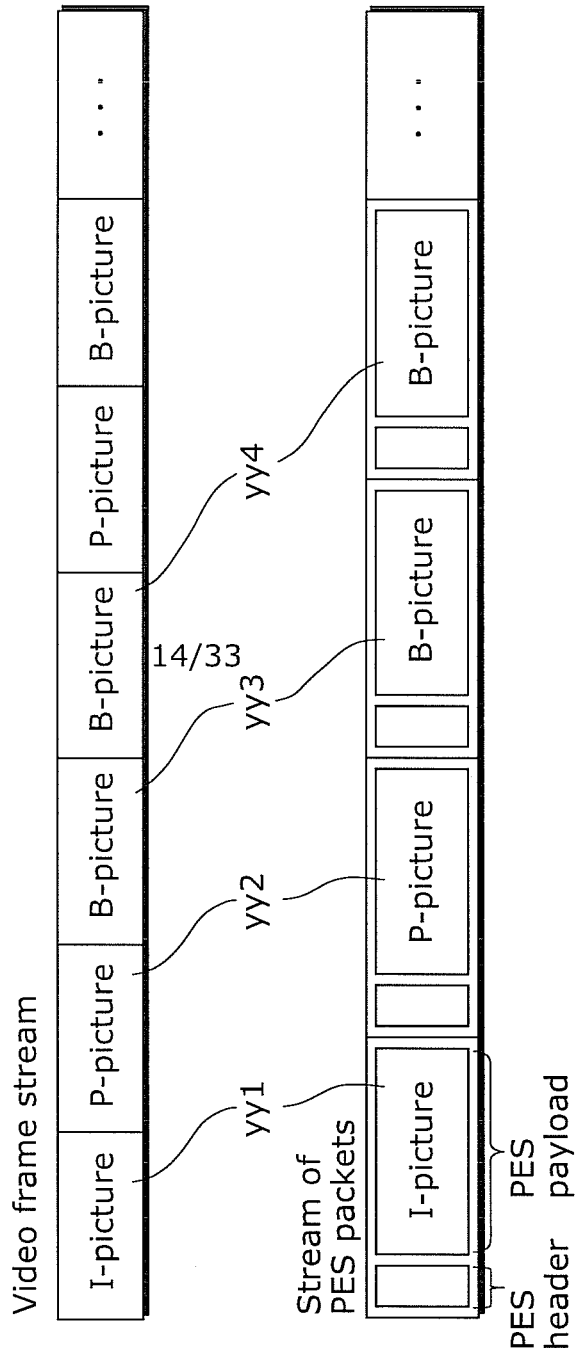
FIG. 22 shows how a video stream is stored in a stream of PES packets in more detail.

FIG. 22 illustrates how a video stream is stored in a stream of PES packets in more detail. The first bar in FIG. 22 shows a video frame stream in a video stream. The second bar shows the stream of PES packets. As indicated by arrows denoted as yy1, yy2, yy3, and yy4 in FIG. 22, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 23 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 23. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 24:
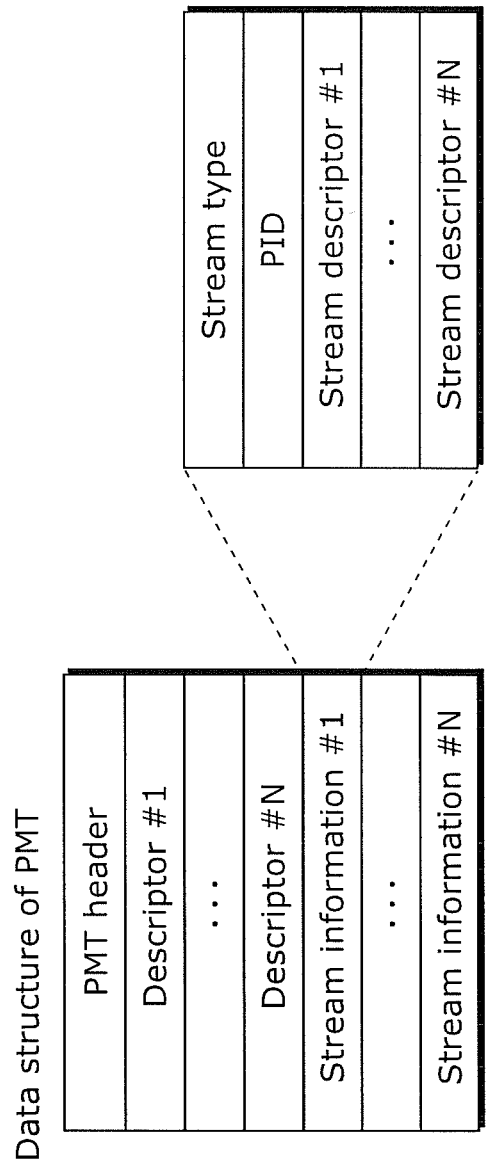
FIG. 24 shows a data structure of a PMT.

FIG. 24 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 25:
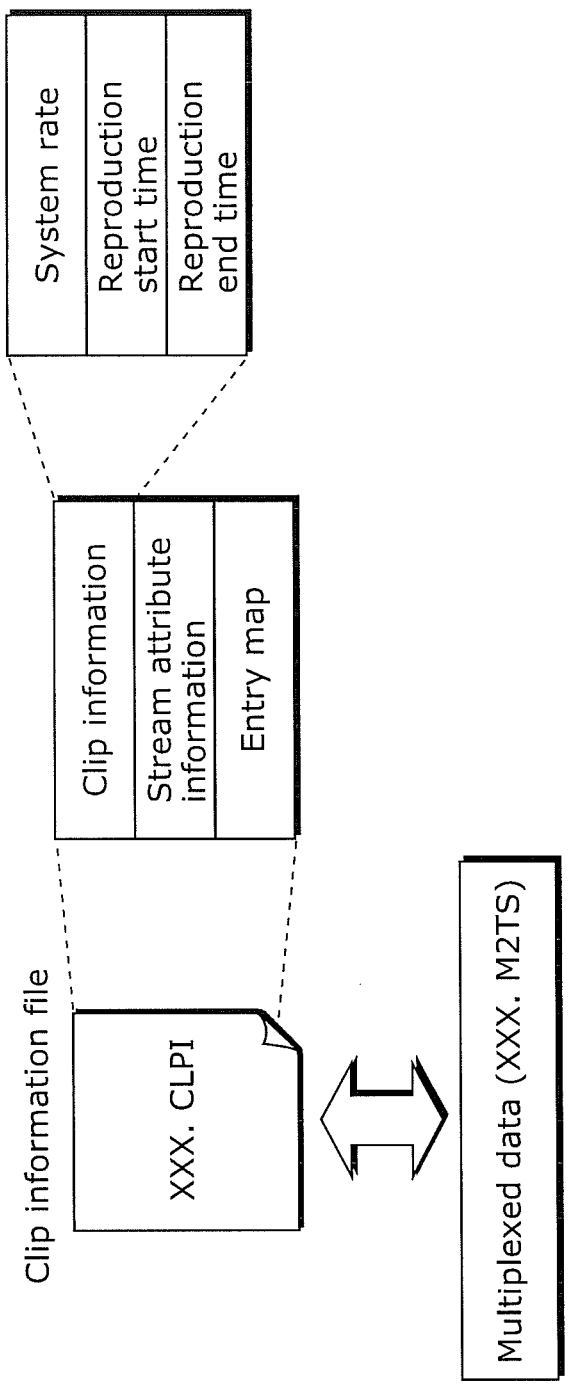
FIG. 25 shows an internal structure of multiplexed data information.

Each of the multiplexed data information files is management information of the multiplexed data as shown in FIG. 25. The multiplexed data information files are in one to one correspondence with the multiplexed data, and each of the files includes multiplexed data information, stream attribute information, and an entry map.

As illustrated in FIG. 25, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 26:
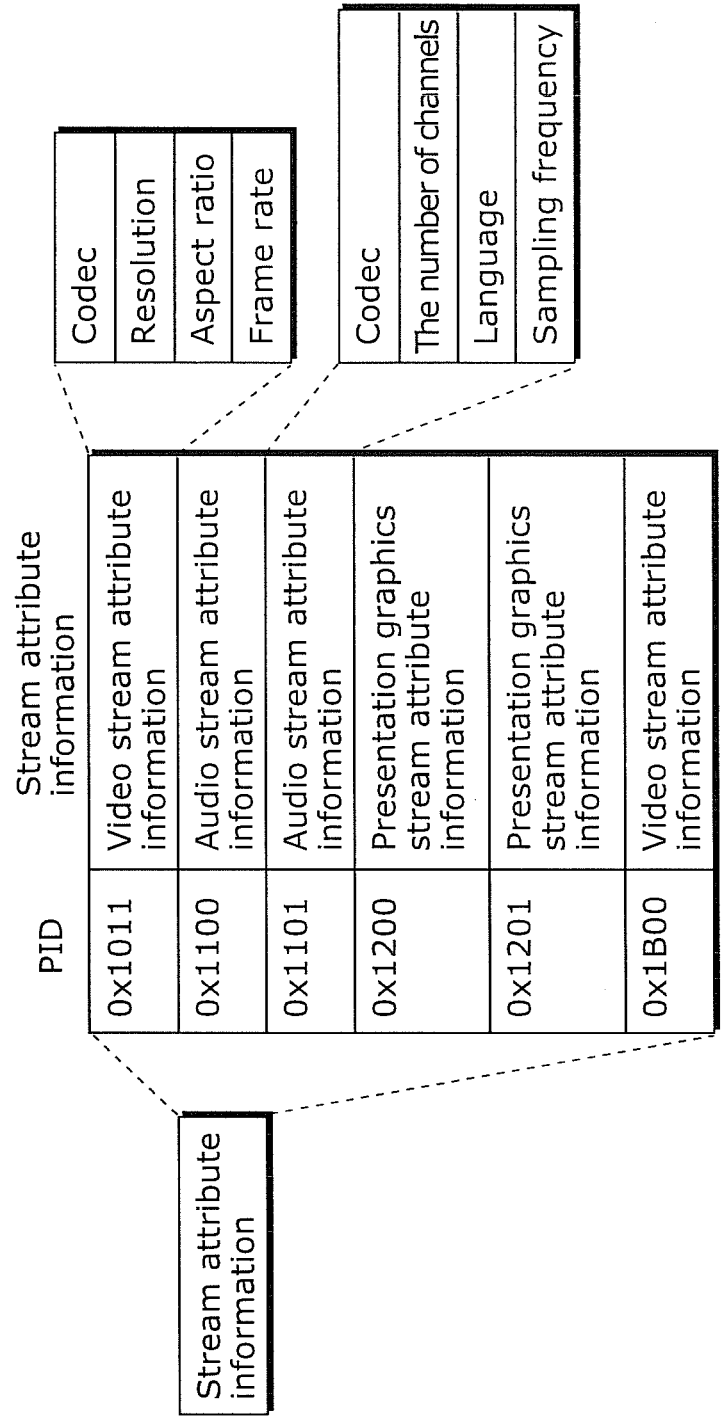
FIG. 26 shows an internal structure of stream attribute information.

As shown in FIG. 26, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 27:
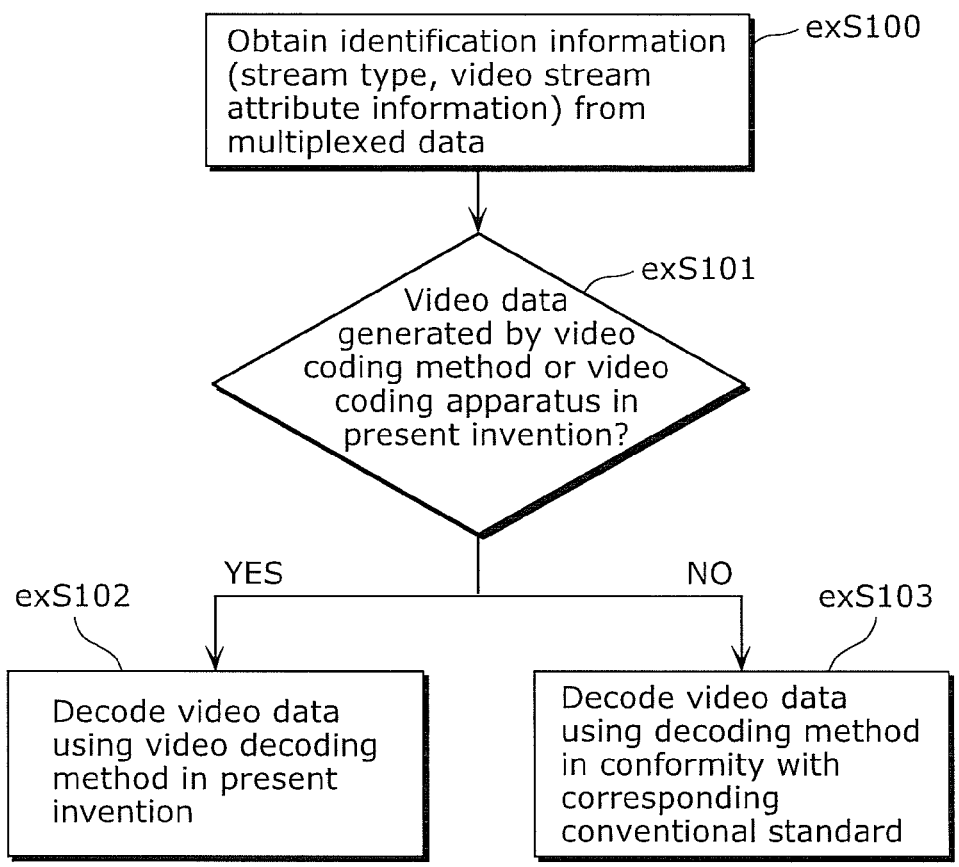
FIG. 27 shows steps for identifying video data.

Furthermore, FIG. 27 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 28:
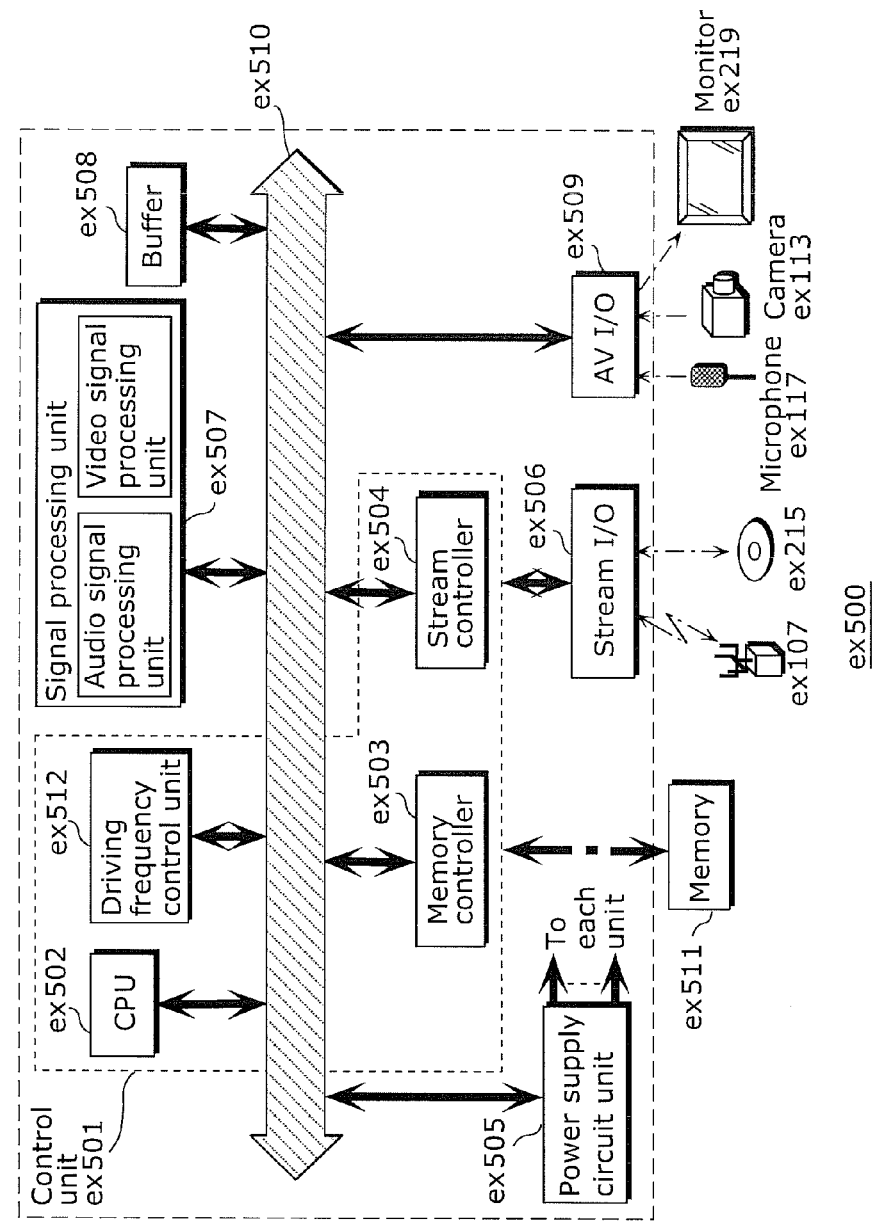
FIG. 28 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 28 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 29:
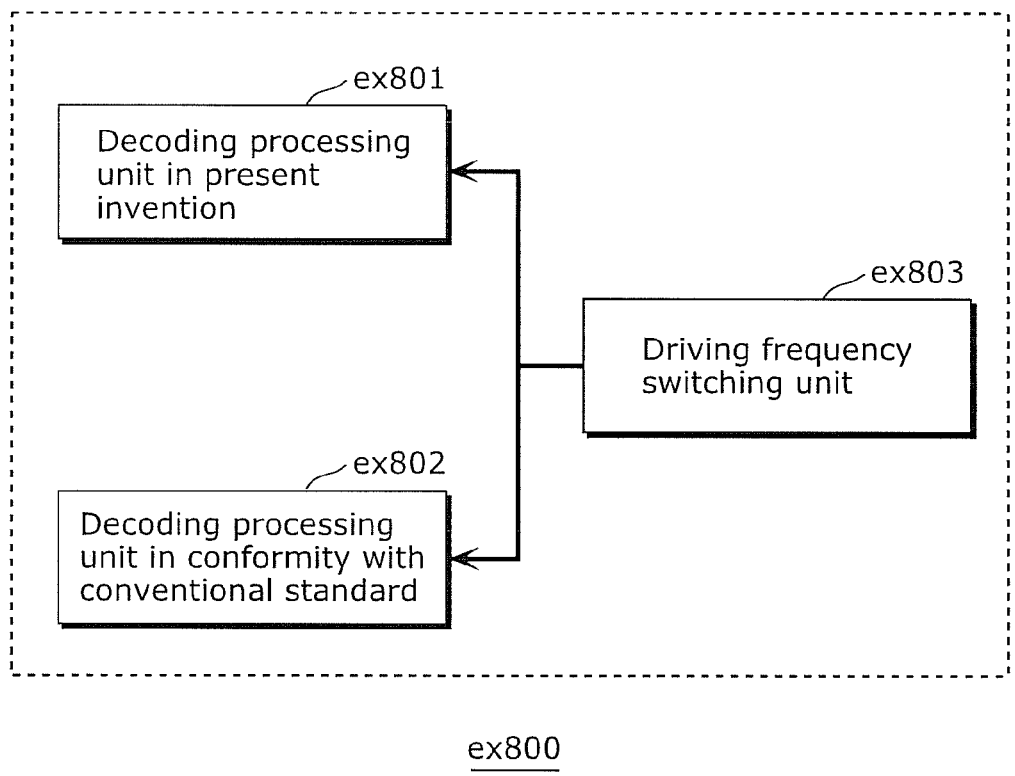
FIG. 29 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 29 illustrates a configuration ex800 in the present embodiment. 2 driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 28. Here, each of the decoding processing unit ex801 that executes the moving picture decoding method described in each of embodiments and the decoding processing unit ex802 that conforms to the conventional standard corresponds to the signal processing unit ex507 in FIG. 28. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 31. The driving frequency can be selected by storing the look-up table in the buffer ex508 and in an internal memory of an LSI, and with reference to the look-up table by the CPU ex502.

Figure 30:
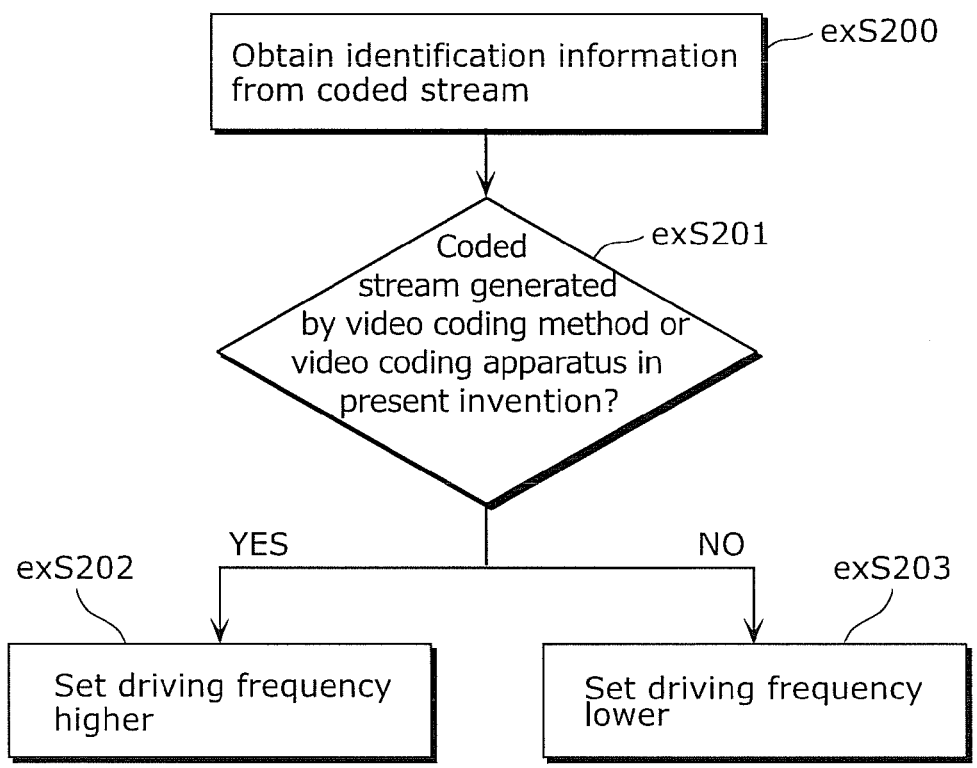
FIG. 30 shows steps for identifying video data and switching between driving frequencies.

FIG. 30 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 32A:
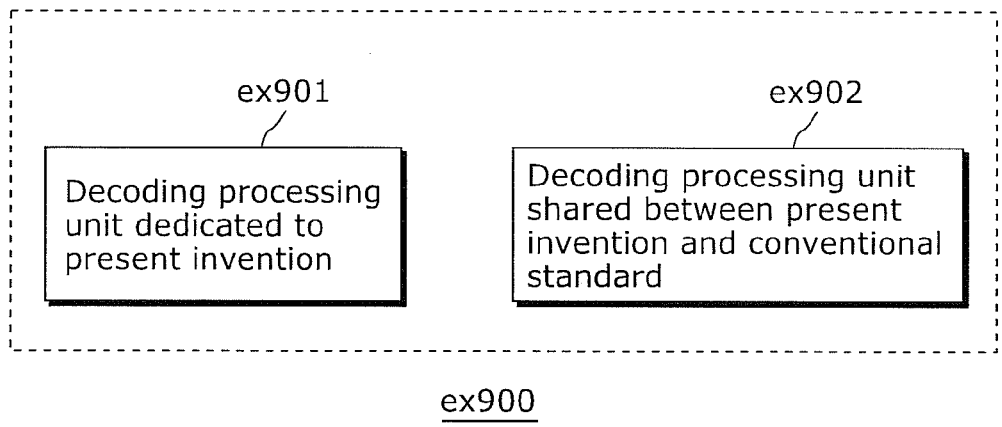
FIG. 32A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 32A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 32B:
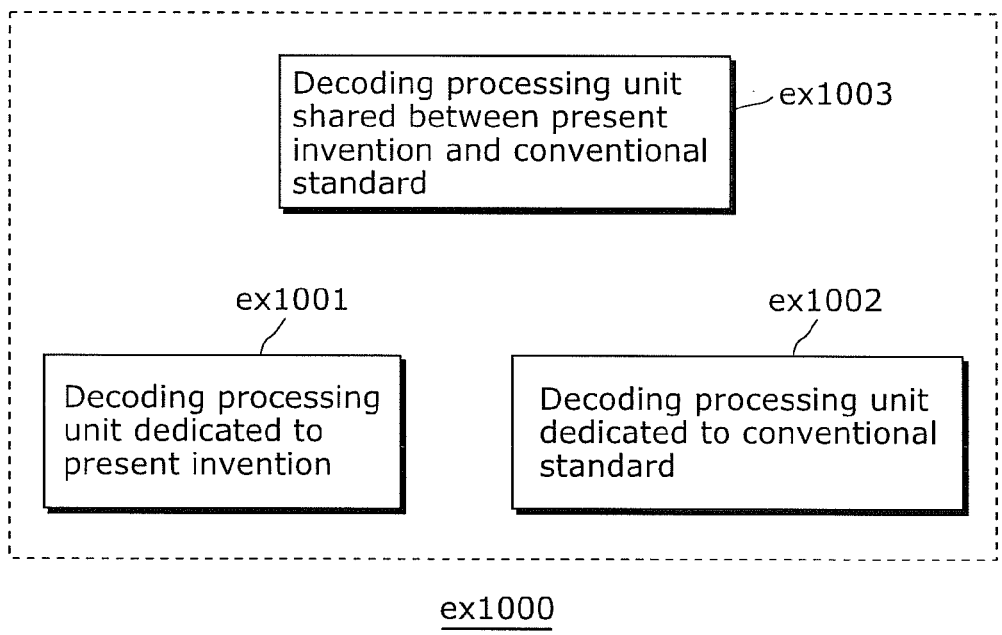
FIG. 32B is a diagram showing another example of a configuration for sharing a module of the signal processing unit.

Furthermore, ex1000 in FIG. 32B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

Methods for encoding and decoding video according to one or more exemplary embodiments disclosed herein have advantages of improving coding efficiency. For example, the methods are applicable to video cameras, mobile phones, and personal computers.

The invention claimed is:

1. An encoding method for encoding a picture, the encoding method comprising:
    splitting the picture into a plurality of tiles, each of the plurality of tiles being characterized by a width parameter and a height parameter;
    writing a plurality of parameters into a header of a bitstream, the plurality of parameters specifying a constraint on motion prediction for a current tile that is one of the plurality of tiles;
    writing the width parameter and the height parameter of each of the plurality of tiles into the header of the bitstream;
    encoding the current tile independently of remaining plurality of tiles included in the picture, without spatial dependency with the remaining plurality of tiles; and
    writing the encoded current tile into the bitstream in an order based on a position of the current tile in raster scan order within the picture.

2. The encoding method according to claim 1, wherein encoded data specifying the encoded picture is subsequent to the header in the bitstream.

3. The encoding method according to claim 1, wherein the header is supplementary enhancement information, of the bitstream, commonly used by the plurality of tiles included in the picture.

4. The encoding method according to claim 1, further comprising
    performing motion prediction on the current tile only using one of a plurality of reference tiles within a reference picture region, the one of the plurality of reference tiles corresponding to the current tile.

5. The encoding method according to claim 1, further comprising:
    writing, into the bitstream for each of the plurality of tiles, a flag representing a decision whether motion prediction is constrained for the tile; and
    judging, for each of the plurality of tiles, whether the corresponding flag has a predetermined value, the tile being encoded independently of remaining plurality of tiles included in the picture, if the corresponding flag is judged to have the predetermined value.

6. An encoding apparatus for encoding a picture, the encoding apparatus comprising:
    a splitting unit that splits the picture into a plurality of tiles, each of the plurality of tiles being characterized by a width parameter and a height parameter
    a writing unit that (i) writes a plurality of parameters into a header of a bitstream, the plurality of parameters specifying a constraint on motion prediction for a current tile that is one of the plurality of tiles and (ii) writes the width parameter and the height parameter of each of the plurality of tiles into the header of the bitstream;
    an encoding unit that encodes the current tile independently of remaining plurality of tiles included in the picture without spatial dependency with the remaining plurality of tiles,
    wherein the writing unit further writes the encoded current tile into the bitstream in an order based on a position of the current tile in raster scan order within the picture.

7. A decoding method for decoding an encoded picture split into a plurality of tiles, the decoding method comprising:
    parsing a picture width parameter and a picture height parameter from a header of a bitstream;
    parsing a number parameters from the header of the bitstream, the number parameters representing a number of the plurality of tiles included in a picture;
    parsing, from the bitstream for each of the plurality of tiles, a width parameter and a height parameter characterizing the tile;
    decoding each of the plurality of tiles, wherein at least one of the plurality of tiles is decoded independently of remaining plurality of tiles included in the picture without spatial dependency with the remaining plurality of tiles; and
    reconstructing a picture by arranging the decoded plurality of tiles in a raster scan order to fill a rectangular region defined by the parsed picture width parameter and the parsed picture height parameter.

8. The decoding method according to claim 7, wherein encoded data specifying the encoded picture is subsequent to the header in the bitstream.

9. The decoding method according to claim 7, wherein the header is supplementary enhancement information, of the bitstream, commonly used by the plurality of tiles of the encoded picture.

10. The decoding method according to claim 7, further comprising
    performing motion prediction on a current tile that is one of the plurality of tiles only using one of a plurality of reference tiles within a reference picture region, the one of the plurality of reference tiles corresponding to the current tile.

11. A decoding apparatus for decoding an encoded picture split into a plurality of tiles, the decoding apparatus comprising:
- a parsing unit that (i) parses a picture width parameter and a picture height parameter from a header of a bitstream, (ii) parses a number parameters from the header of the bitstream, the number parameters representing a number of the plurality of tiles included in a picture, and (iii) parses, from the bitstream for each of the plurality of tiles, a width parameter and a height parameter characterizing the tile;
- a decoding unit that decodes each of the plurality of tiles, wherein at least one of the plurality of tiles is decoded independently of remaining plurality of tiles included in the picture without spatial dependency with the remaining plurality of tiles; and
- an arranging unit that reconstructs a picture by arranging the decoded plurality of tiles in a raster scan order to fill a rectangular region defined by the parsed picture width parameter and the parsed picture height parameter.

12. The decoding method according to claim 7, further comprising:
- parsing, from the bitstream for each of the plurality of tiles, a flag representing a decision whether motion prediction is constrained for the tile; and
- judging, for each of the plurality of tiles, whether the corresponding flag has a predetermined value, the tile being decoded independently of remaining plurality of tiles included in the picture, if the corresponding flag is judged to have the predetermined value.

* * * * *